(12) United States Patent
Takimoto

(10) Patent No.: US 10,387,026 B2
(45) Date of Patent: Aug. 20, 2019

(54) APPARATUS, METHOD, COMPUTER-READABLE STORAGE MEDIUM, AND SMARTPHONE FOR CAUSING SCROLLING OF CONTENT IN RESPONSE TO TOUCH OPERATIONS

(71) Applicant: SONY CORPORATION, Tokyo (JP)

(72) Inventor: Yuuji Takimoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 527 days.

(21) Appl. No.: 14/888,814

(22) PCT Filed: Apr. 17, 2014

(86) PCT No.: PCT/JP2014/002193
§ 371 (c)(1),
(2) Date: Nov. 3, 2015

(87) PCT Pub. No.: WO2014/199548
PCT Pub. Date: Dec. 18, 2014

(65) Prior Publication Data
US 2016/0085401 A1    Mar. 24, 2016

(30) Foreign Application Priority Data

Jun. 11, 2013    (JP) ................................ 2013-122746

(51) Int. Cl.
| | | |
|---|---|---|
| G06F 9/451 | (2018.01) | |
| G06F 3/0481 | (2013.01) | |
| G06F 3/0482 | (2013.01) | |
| G06F 3/0485 | (2013.01) | |
| G06F 3/0488 | (2013.01) | |

(52) U.S. Cl.
CPC .......... *G06F 3/0485* (2013.01); *G06F 3/0481* (2013.01); *G06F 3/0482* (2013.01); *G06F 3/0488* (2013.01); *G06F 9/451* (2018.02)

(58) Field of Classification Search
CPC .... G06F 3/0481; G06F 3/0482; G06F 3/0485; G06F 3/0488; G06F 9/4443; G06F 9/451
See application file for complete search history.

(56) References Cited

U.S. PATENT DOCUMENTS

| | | |
|---|---|---|
| 6,199,080 B1 | 3/2001 | Nielsen |
| 2008/0168405 A1 | 7/2008 | Tolmasky et al. |

(Continued)

FOREIGN PATENT DOCUMENTS

| | | |
|---|---|---|
| CN | 101617288 A | 12/2009 |
| CN | 101910991 A | 12/2010 |

(Continued)

OTHER PUBLICATIONS

Office Action dated Nov. 22, 2016 in Japanese Patent Application No. 2013-122746.

(Continued)

*Primary Examiner* — Eric J. Bycer
(74) *Attorney, Agent, or Firm* — XSENSUS LLP

(57) ABSTRACT

An information processing system includes circuitry that causes a first scrolling of a displayed content region within its boundaries in response to a first user operation. The circuitry of the information processing system also causes a second scrolling of the displayed content region beyond its boundaries in response to a second user operation.

21 Claims, 15 Drawing Sheets

(56) References Cited

U.S. PATENT DOCUMENTS

| | | | | |
|---|---|---|---|---|
| 2009/0249247 | A1* | 10/2009 | Tseng | H04M 1/72552 715/808 |
| 2010/0269038 | A1* | 10/2010 | Tsuda | G06F 3/0485 715/702 |
| 2011/0037720 | A1* | 2/2011 | Hirukawa | G06F 3/0488 345/173 |
| 2011/0090255 | A1* | 4/2011 | Wilson | G06F 3/04817 345/647 |
| 2012/0131519 | A1* | 5/2012 | Jitkoff | G06F 3/0481 715/863 |
| 2013/0007665 | A1* | 1/2013 | Chaudhri | H04L 51/24 715/830 |
| 2013/0237288 | A1* | 9/2013 | Lee | G06F 3/041 455/566 |
| 2013/0307783 | A1* | 11/2013 | Park | G06F 3/04886 345/169 |
| 2014/0139471 | A1* | 5/2014 | Matsuki | G06F 3/0485 345/173 |
| 2014/0304625 | A1* | 10/2014 | Ke | G06F 17/30905 715/760 |
| 2014/0313147 | A1* | 10/2014 | Joe | G06F 3/041 345/173 |
| 2014/0362119 | A1* | 12/2014 | Freund | G06F 3/017 345/661 |

FOREIGN PATENT DOCUMENTS

| | | | |
|---|---|---|---|
| CN | 102016779 | A | 4/2011 |
| EP | 0 827 094 | A2 | 3/1998 |
| JP | 2008-27183 | A | 2/2008 |
| JP | 2008-89717 | A | 4/2008 |
| JP | 2009-163356 | A | 7/2009 |
| JP | 2009-230765 | A | 10/2009 |
| JP | 2010-3307 | A | 1/2010 |
| JP | 2010-79442 | A | 4/2010 |
| JP | 2011-516936 | A | 5/2011 |
| JP | 2011-113512 | A | 6/2011 |
| JP | 2012-58910 | A | 3/2012 |
| JP | 2012-108674 | A | 6/2012 |
| JP | 2012-524318 | A | 10/2012 |
| JP | 1012-529675 | A | 11/2012 |
| JP | 2013-25594 | A | 2/2013 |
| JP | 2013-88833 | A | 5/2013 |
| JP | 2013-218428 | A | 10/2013 |
| JP | 2014-126949 | A | 7/2014 |
| JP | 2014-211720 | A | 11/2014 |
| WO | WO 2013/035229 | A1 | 3/2013 |

OTHER PUBLICATIONS

International Search Report dated Sep. 12, 2014 in PCT/JP14/02193 Filed Apr. 17, 2014.
Office Action dated Feb. 14, 2017 in Japanese Patent Application No. 2013-122746.
Combined Office Action and Search Report dated Apr. 2, 2018 in Chinese Patent Application No. 201480032215.X (with English language translation), 21 pages.
Office Action dated Feb. 27, 2018 in corresponding Japanese Patent Application No. 2017-108905 (with English Translation), 8 pages.
Asako Fusano, Thoroughgoing Evaluation of New Face of ARROWS which is "The newest smart phone made in Japan", ITmedia, Japan, May 24, 2013, [Retrieval Date: Feb. 20, 2018], Internet <URL: http://www.itmedia.co.jp/mobile/articles/1305/23/news008_2.html>.
Japanese Office Action dated Feb. 22, 2019, issued in corresponding Japanese Application No. 2018-115906.

* cited by examiner

[Fig. 1]
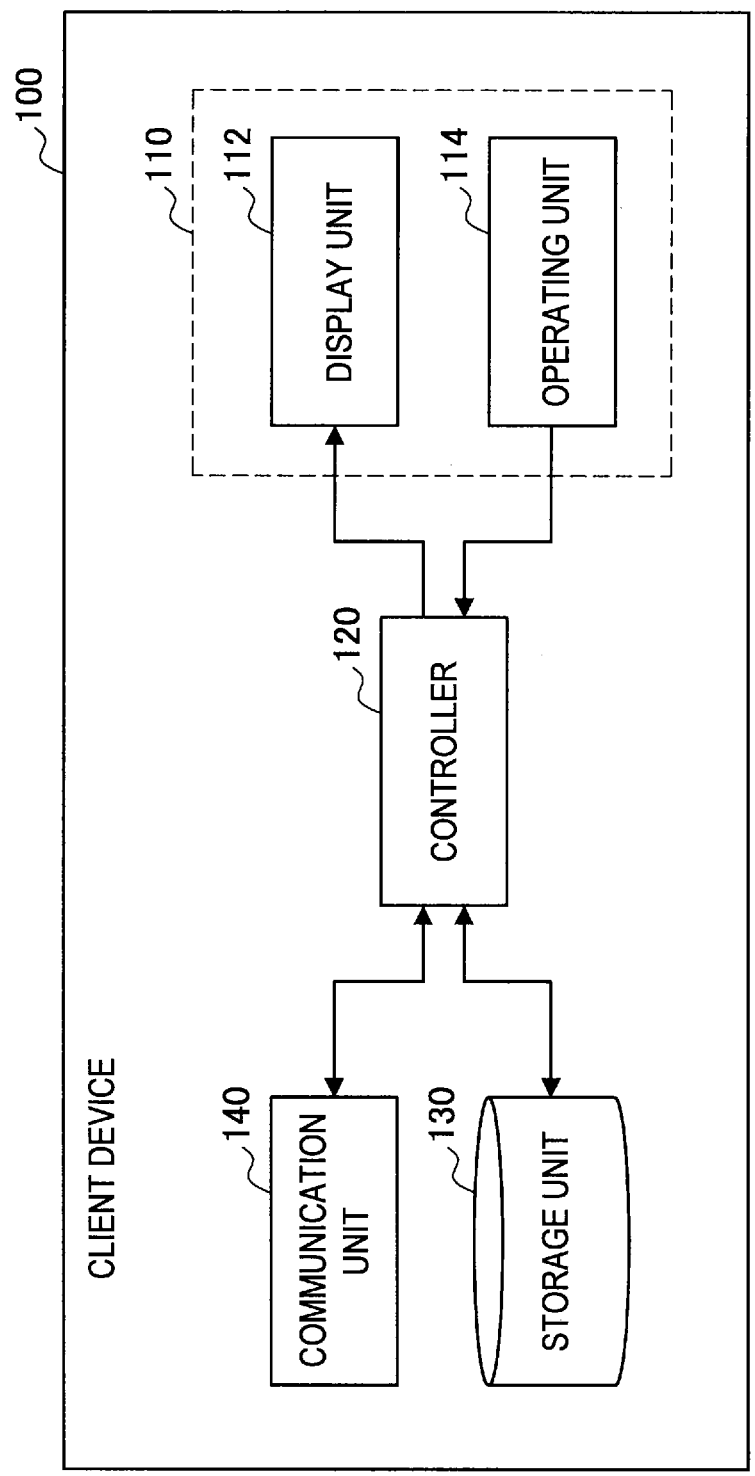

[Fig. 2]
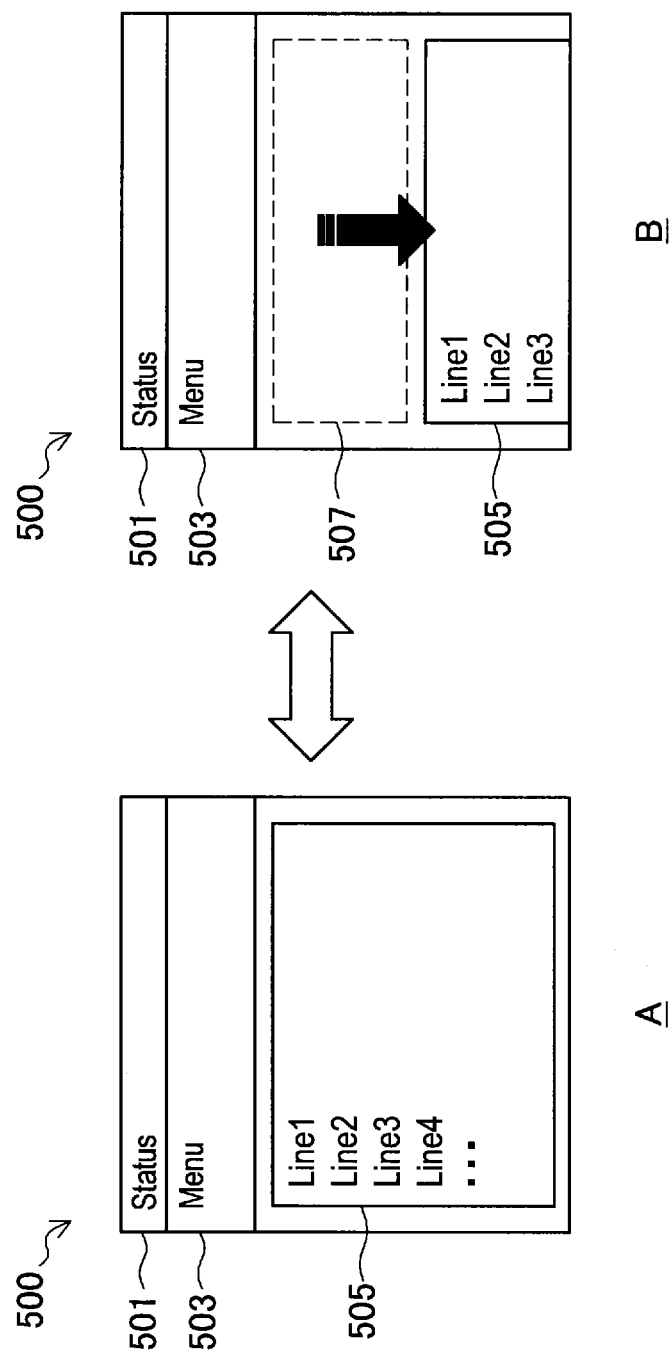

[Fig. 3]
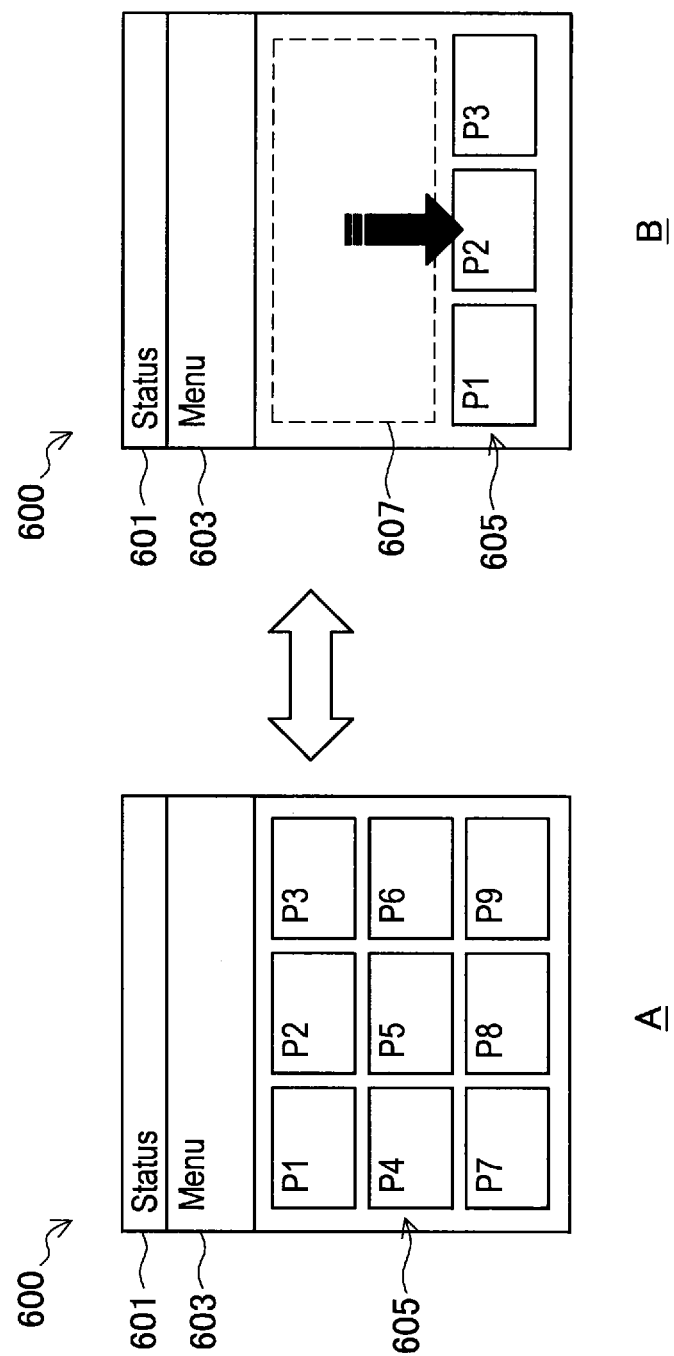

[Fig. 4]
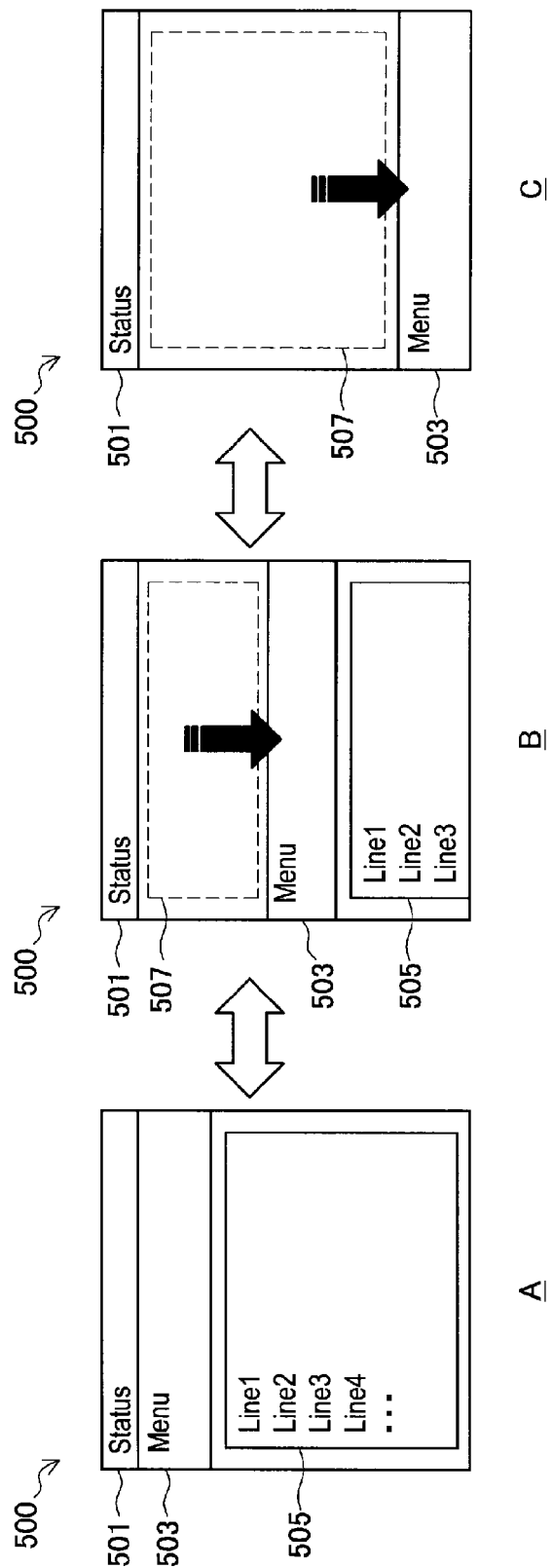

[Fig. 5]
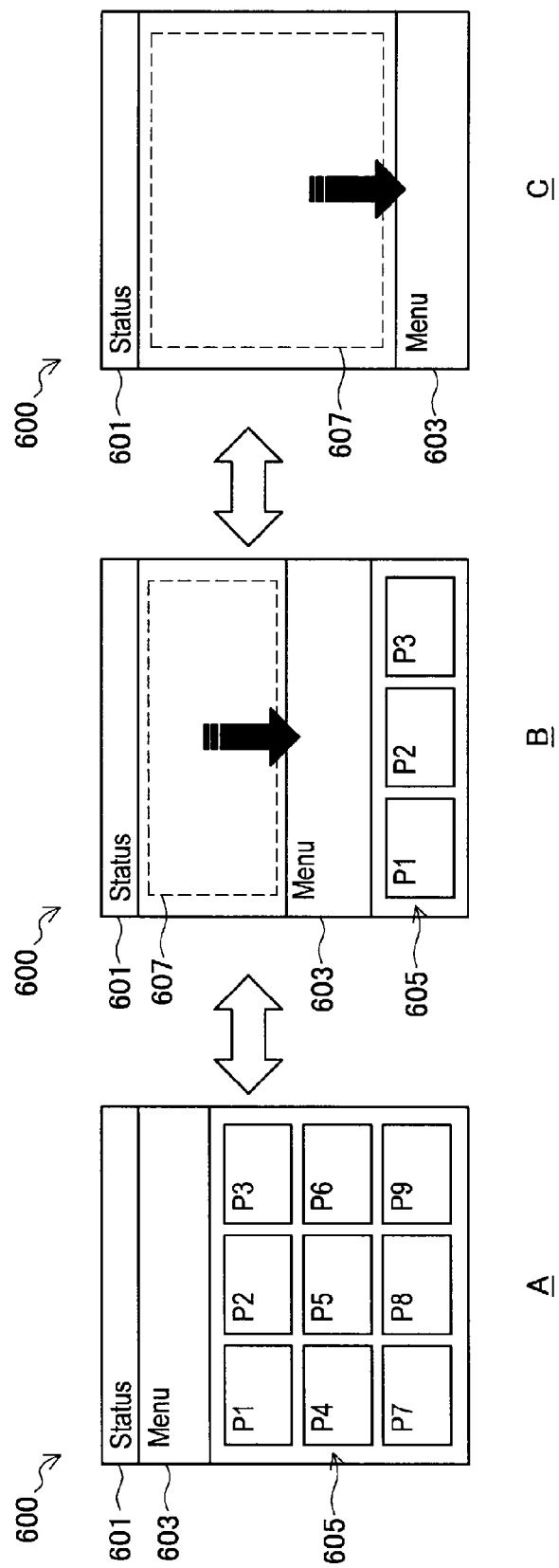

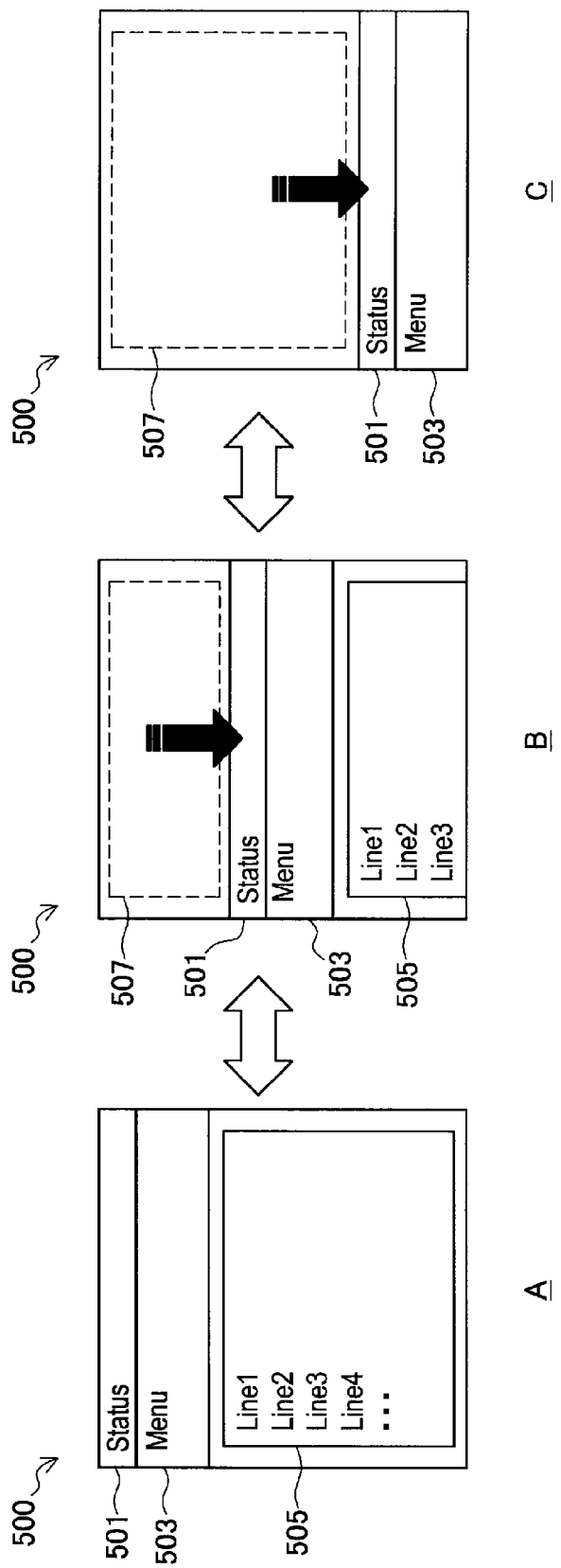
[Fig. 6]

[Fig. 7]
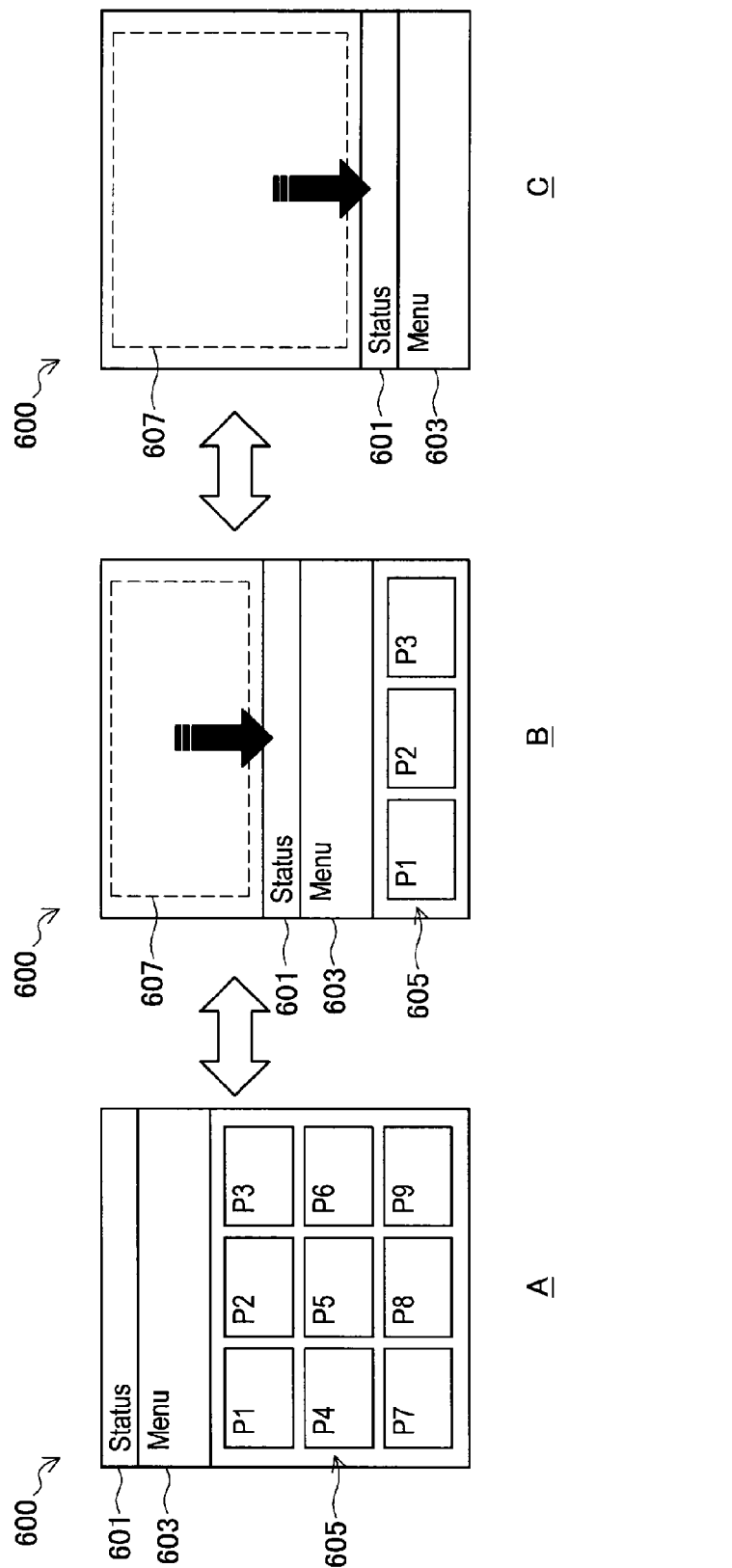

[Fig. 8]
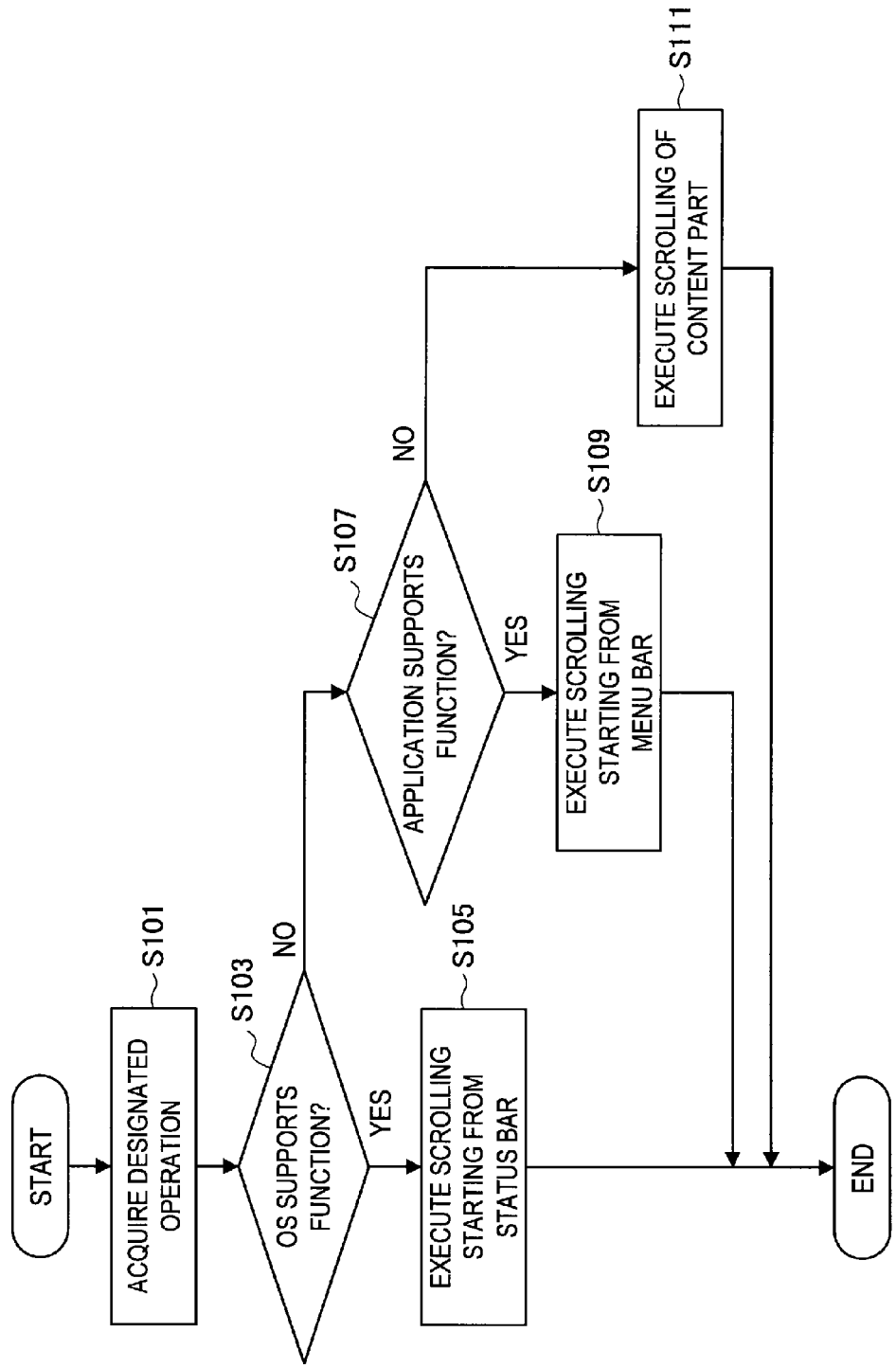

[Fig. 9]
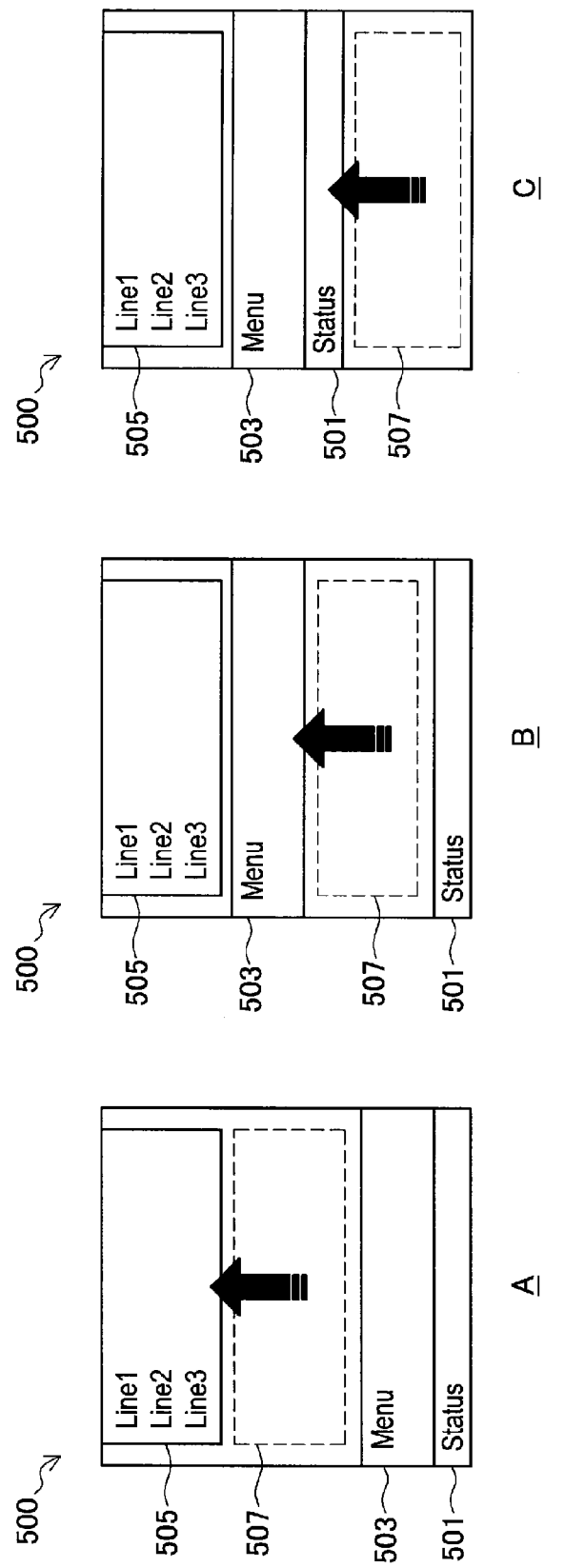

[Fig. 10]
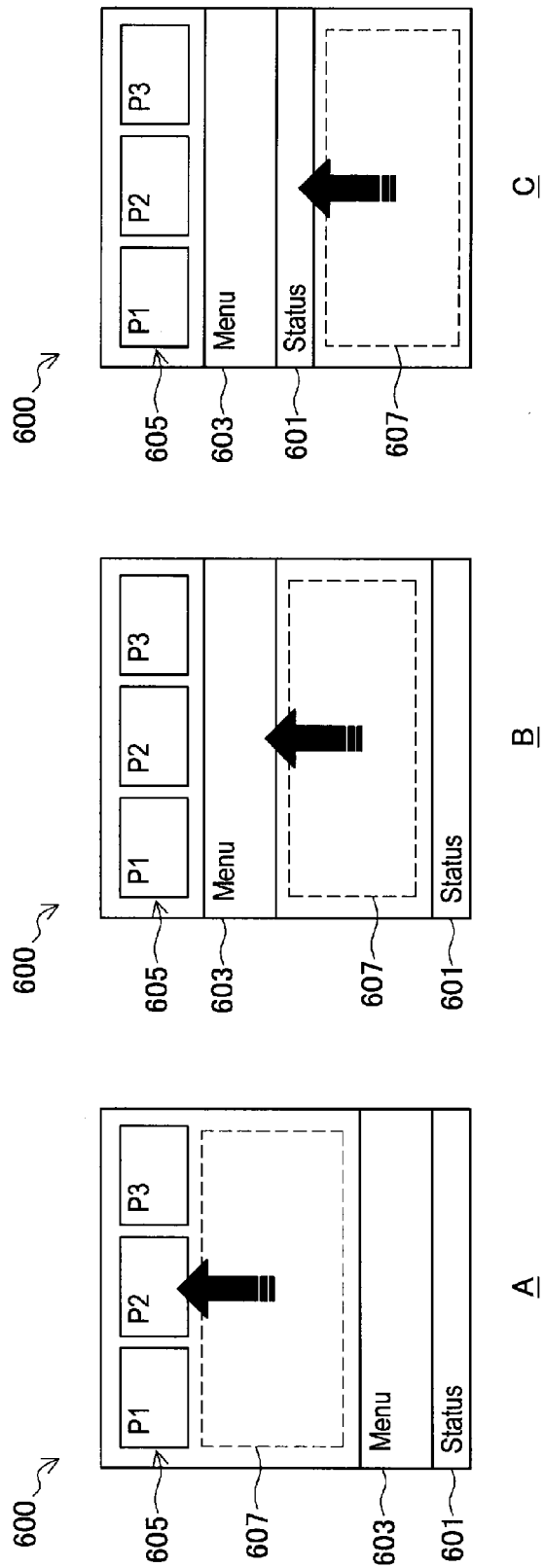

[Fig. 11]
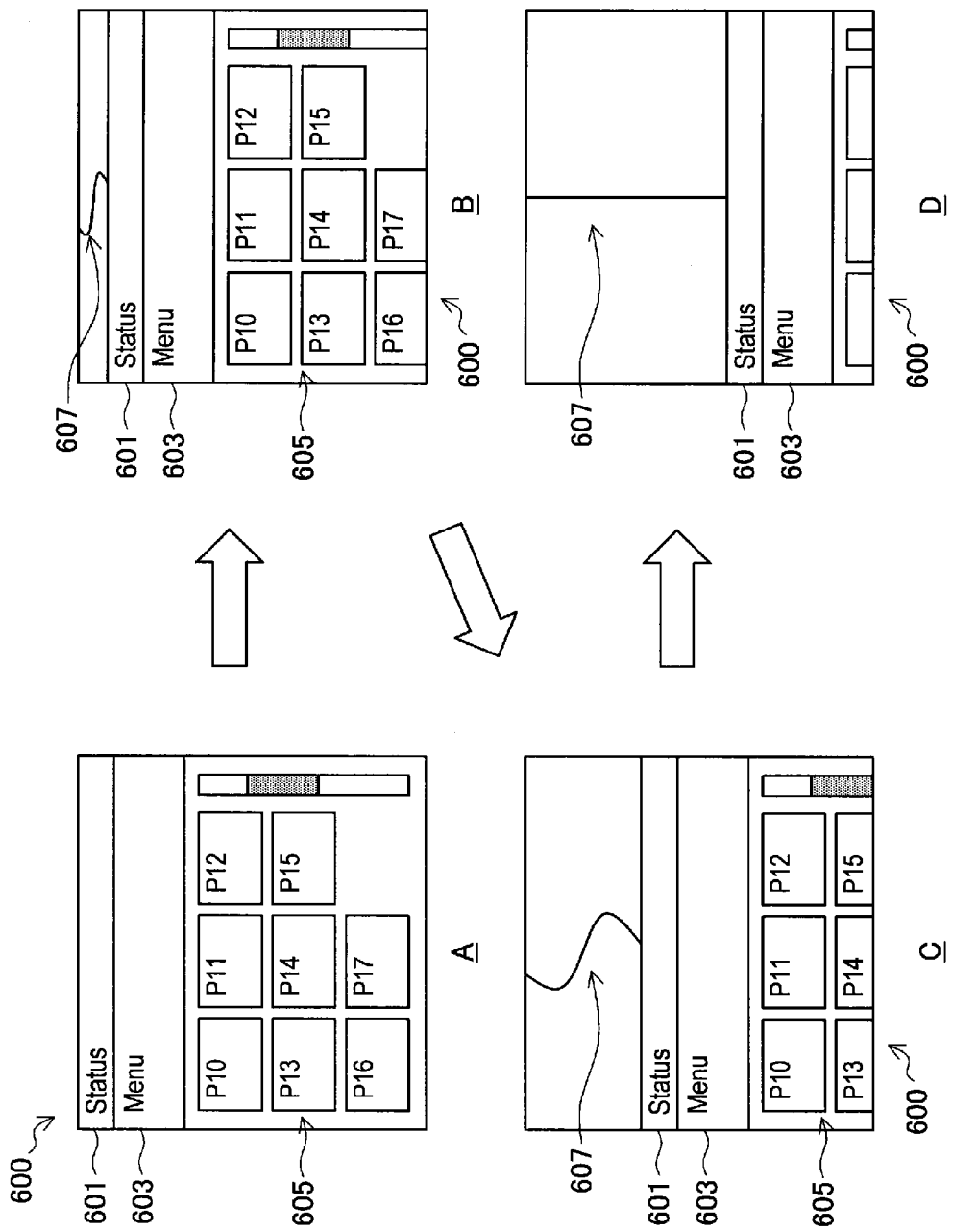

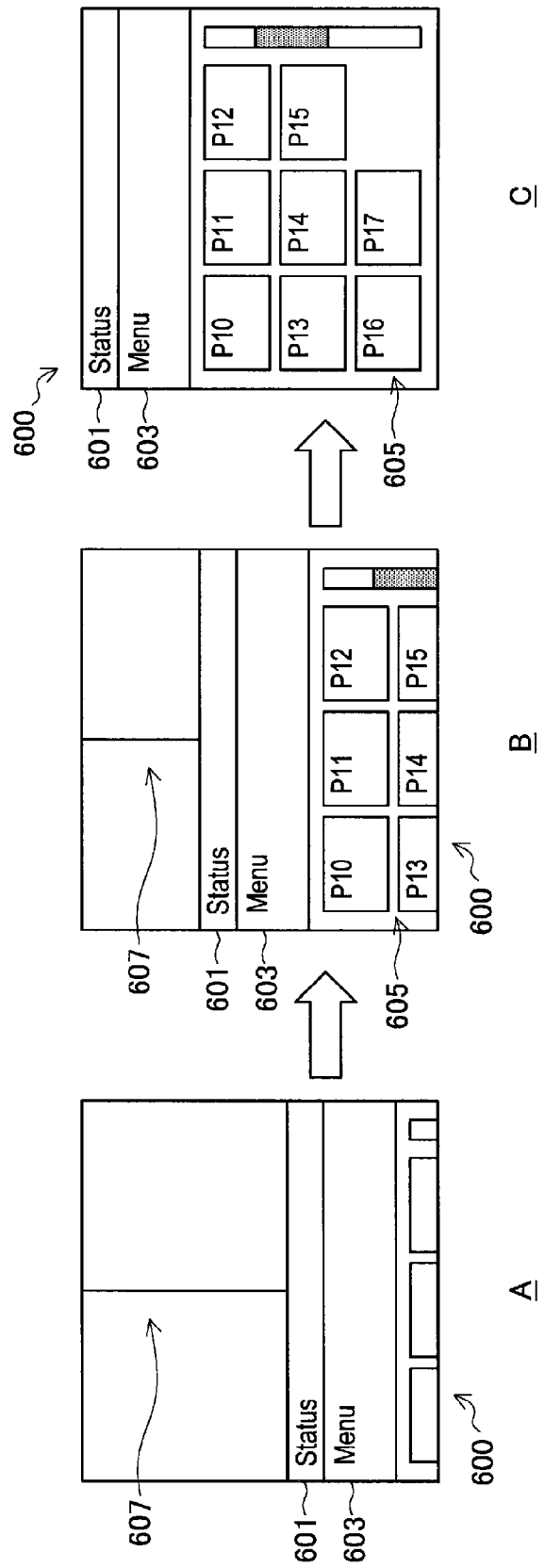
[Fig. 12]

[Fig. 13]
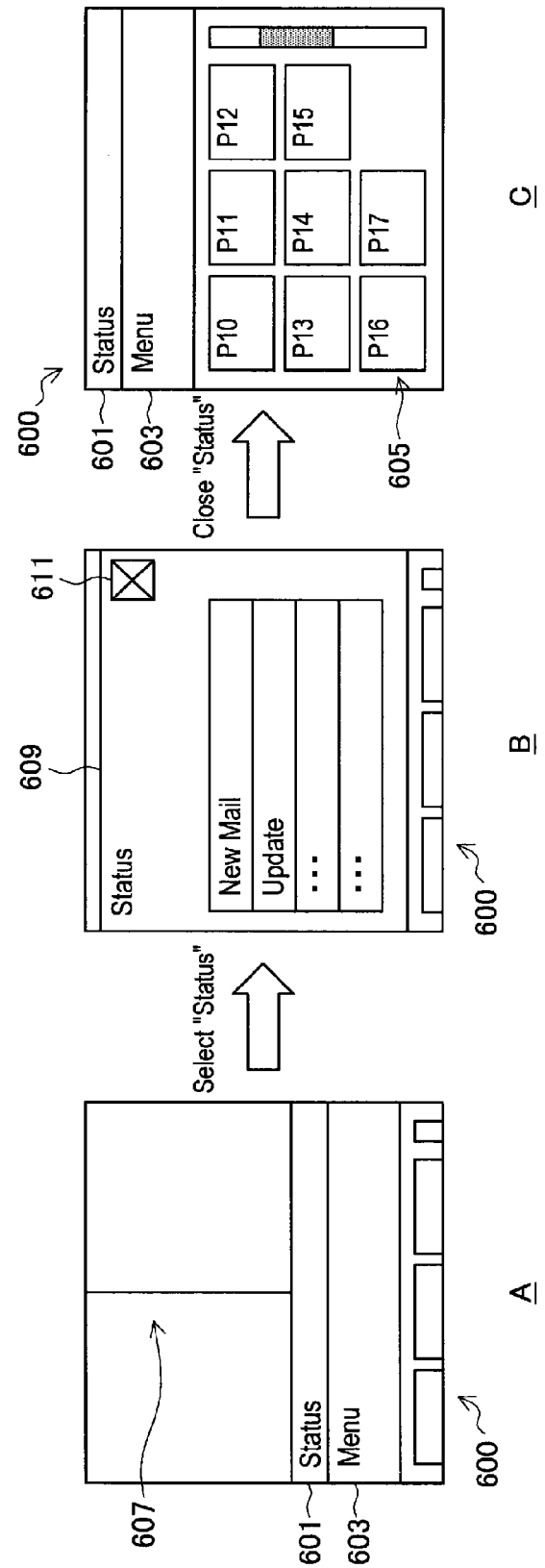

[Fig. 14]
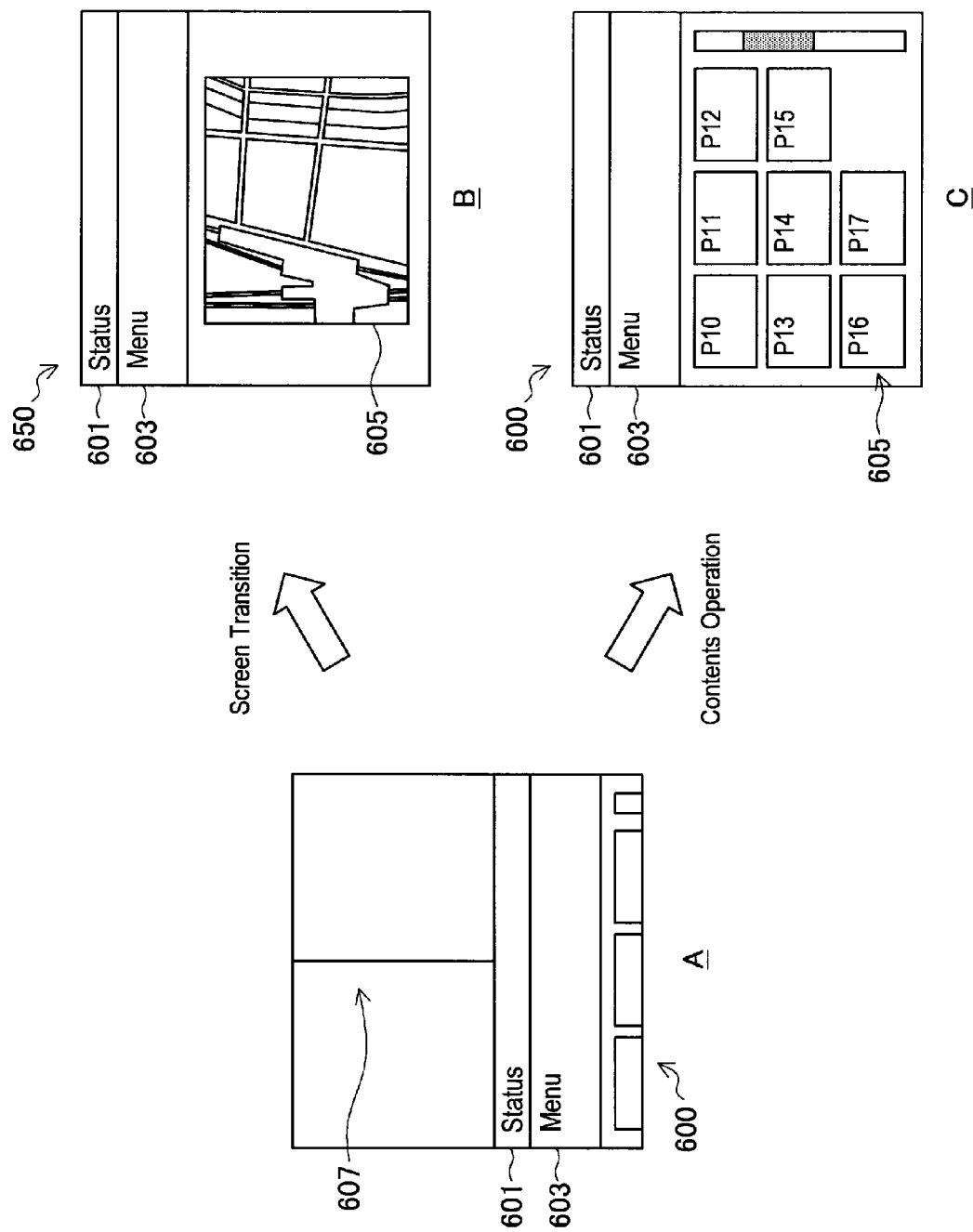

[Fig. 15]
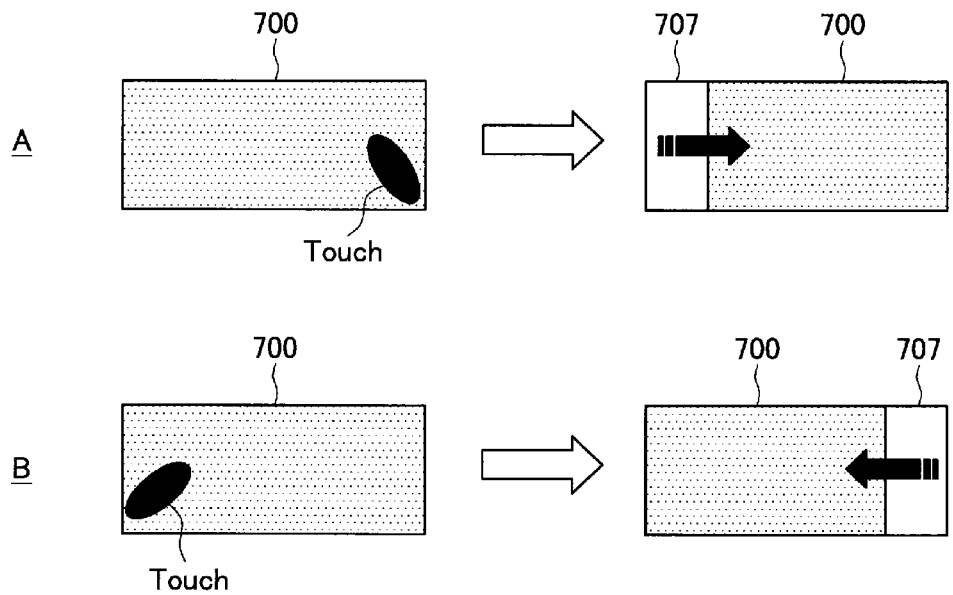
[Fig. 16]
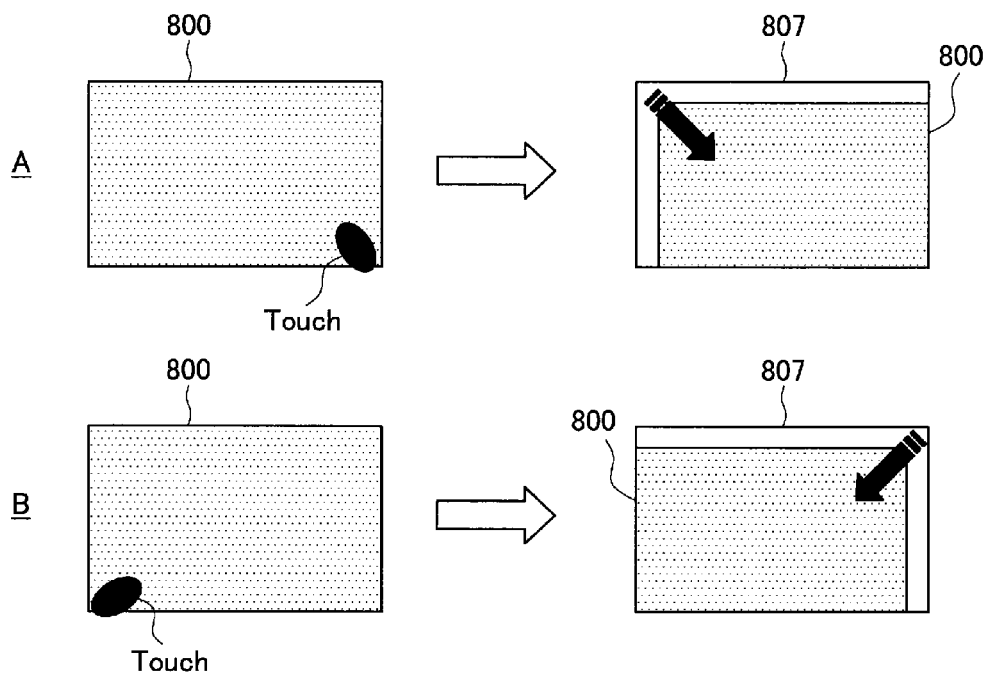

APPARATUS, METHOD, COMPUTER-READABLE STORAGE MEDIUM, AND SMARTPHONE FOR CAUSING SCROLLING OF CONTENT IN RESPONSE TO TOUCH OPERATIONS

CROSS REFERENCE TO RELATED APPLICATIONS

This application claims the benefit of Japanese Priority Patent Application JP 2013-122746 filed Jun. 11, 2013, the entire contents of which are incorporated herein by reference.

TECHNICAL FIELD

The present disclosure relates to a display control device, a display control method, and a program.

BACKGROUND ART

Recently, client devices equipped with a touchscreen display are rapidly proliferating. In such devices, content displayed on the display is scrolled, as described in PTL 1, for example. With scrolling, content that does not fully fit on the display may be partially displayed on the display, and the entire content may be expressed by scrolling the portion to display, for example.

CITATION LIST

Patent Literature

PTL 1: JP 2012-524318T

SUMMARY

Technical Problem

Scrolling on a touchscreen display as above may realize a function of moving a portion of content to display on the display, and in addition, a function of moving an operable item displayed on the display. For example, an interface element such as a link or button included in content on a web page may be moved by scrolling to a position easily reached by a user's finger. The utility of such an operation is increasing as the displays in recent mobile client devices become larger, for example.

However, since the original purpose of scrolling is to display content on a display, a function of moving an operable item to a position easily reached by a finger as above may not necessarily be realized. For example, it is difficult to move an interface element to a user-desired position in the case in which the interface element that the user wants to operate is positioned at the edge of content, since scrolling ends at the edge of the content.

Accordingly, the present disclosure proposes a new and improved display control device, display control method, and program enabling further improvement in the usability of a touchscreen display using scrolling movement.

Solution to Problem

In a first exemplary aspect, an information processing system includes circuitry that causes a first scrolling of a displayed content region within boundaries of the displayed content region in response to a first user operation. The circuitry also causes a second scrolling of the displayed content region beyond the boundaries thereof in response to a second user operation.

In a second exemplary aspect, an information processing method includes causing, with circuitry, first scrolling of a displayed content region within boundaries of the displayed content region in response to a first user operation. The method also includes causing, with the circuitry, a second scrolling of the displayed content region beyond the boundaries thereof in response to a second user operation.

In a third exemplary aspect, a non-transitory computer-readable medium is encoded with computer-readable instructions thereon that, when executed by a computer cause the computer to perform a method that includes causing a first scrolling of a displayed content region within boundaries of the displayed content region in response to a first user operation. The method also includes causing a second scrolling of the displayed content region beyond the boundaries thereof in response to a second user operation.

Advantageous Effects of Invention

According to an embodiment of the present disclosure as described above, the usability of a touchscreen display using scrolling movement may be further improved.

BRIEF DESCRIPTION OF DRAWINGS

FIG. 1 is a block diagram illustrating a schematic functional configuration of a client device according to a first embodiment of the present disclosure.

FIG. 2 is a diagram illustrating a first display example by a client device according to the first embodiment of the present disclosure.

FIG. 3 is a diagram illustrating a second display example by a client device according to the first embodiment of the present disclosure.

FIG. 4 is a diagram illustrating a first display example by a client device according to a second embodiment of the present disclosure.

FIG. 5 is a diagram illustrating a second display example by a client device according to the second embodiment of the present disclosure.

FIG. 6 is a diagram illustrating a first display example by a client device according to a third embodiment of the present disclosure.

FIG. 7 is a diagram illustrating a second display example by a client device according to the third embodiment of the present disclosure.

FIG. 8 is a flowchart illustrating an example of a process by a client device according to a fourth embodiment of the present disclosure.

FIG. 9 is a diagram illustrating an example of upward scrolling movement according to another embodiment of the present disclosure.

FIG. 10 is a diagram illustrating an example of upward scrolling movement according to another embodiment of the present disclosure.

FIG. 11 is a diagram illustrating an example of automatic stopping and spacer display according to another embodiment of the present disclosure.

FIG. 12 is a diagram illustrating a display example when reverting the scrolling movement illustrated in FIG. 11.

FIG. 13 is a diagram illustrating another display example when reverting the scrolling movement illustrated in FIG. 11.

FIG. 14 is a diagram illustrating yet another display example when reverting the scrolling movement illustrated in FIG. 11.

FIG. 15 is a diagram illustrating a display example of a horizontal screen according to another embodiment of the present disclosure.

FIG. 16 is a diagram illustrating a display example of a large screen according to another embodiment of the present disclosure.

DESCRIPTION OF EMBODIMENTS

Hereinafter, preferred embodiments of the present disclosure will be described in detail and with reference to the attached drawings. Note that, in this specification and the appended drawings, structural elements that have substantially the same function and structure are denoted with the same reference numerals, and repeated explanation of these structural elements is omitted.

Hereinafter, the description will proceed in the following order.

1. First embodiment
1-1. Device configuration
1-2. Display examples
2. Second embodiment
3. Third embodiment
4. Fourth embodiment
5. Other embodiments
5-1. Upward scrolling movement
5-2. Automatic stopping and spacer display
5-3. Display when reverting
5-4. Display in the case of a horizontal screen
5-5. Display in the case of a large screen
6. Supplemental remarks

1. First Embodiment

1-1. Device Configuration

FIG. 1 is a block diagram illustrating a schematic functional configuration of a client device according to the first embodiment of the present disclosure. Referring to FIG. 1, a client device 100 includes a touchscreen display 110, a controller 120, a storage unit 130, and a communication unit 140. This functional configuration may be realized by the hardware configuration of an information processing device discussed later, for example.

For the sake of brevity, the present advancements are described herein using a client device 100 that is operated using a touchscreen display, such as a smartphone, tablet, portable game console, or media player, for example. However, as one of ordinary skill in the art would recognize, the present advancements may be on other devices using other input methods. For example, the present advancements may be used in conjunction with a user interface that projects a graphical user interface onto a surface and which receives user input by recognizing user movement in a captured image of the surface. The present advancements can also be used in conjunction with a user interface that receives user input based on a user's proximity thereto rather than based on a user touch of the interface. Thus, the following descriptions are merely exemplary and not limiting upon the scope of the advancements presented herein.

The touchscreen display 110 includes a display unit 112 and an operating unit 114. The display unit 112 is a display device such as a liquid crystal display (LCD) or an organic electroluminescent (EL) display, for example, that displays and presents various images to a user under control by the controller 120. The operating unit 114 is a touch sensor of various types, for example, that detects and provides user-given contact with the screen of the display unit 112 to the controller 120 as operating input.

Herein, the client device 100 is capable of providing a user with, for example, web pages and content such as images, video, and music by displaying images with the display unit 112 and/or outputting audio with a speaker (not illustrated). The display unit 112 may also display a content list in which are arranged character strings, thumbnail images, icons, or the like that indicate such content. Furthermore, the display unit 112 may also display an interface element in an image. An interface element is a graphical user interface (GUI) component that is displayed together with content and is capable of receiving an operation on the content such as play, stop, or move, or a component that is displayed together with a content list and is capable of receiving an operation on respective content such as play, delete, or move, for example.

Also, in some cases content or a content list is displayed while being scrolled on the display unit 112, for example. More specifically, in the case in which the entirety of a web page does not fit within the size of the display unit 112, a portion of the web page is displayed on the display unit 112, and the displayed portion may be moved as a result of a user's drag operation, flick operation, or the like. As another example, in the case in which a content list displaying all content does not fit within the size of the display unit 112, a portion of the content list is displayed on the display unit 112, and the range of content displayed on the content list moves as a result of a user's drag operation, flick operation, or the like.

The controller 120 is a processor such as a central processing unit (CPU) that controls respective components of the client device 100 by operating according to a program stored in the storage unit 130. For example, the controller 120 controls the display on the touchscreen display 110. More specifically, the controller 120, according to operating input acquired by the operating unit 114, controls the display of content or a content list acquired from the storage unit 130 or the communication unit 140 discussed later on the display unit 112. In addition, the controller 120 may also generate a content list on the basis of information acquired from the storage unit 130 or the communication unit 140, and cause the generated content list to be displayed on the display unit 112. Furthermore, the controller 120, according to operating input acquired by the operating unit 114, may perform operations on the data of content stored in the storage unit 130, or perform operations on the data of content on a network via the communication unit 140.

Herein, the controller 120 executes a first scrolling control that scrolls a document displayed on the touchscreen display 110 within a display region that includes the document. In addition, the controller 120 executes a second scrolling control that causes scrolling movement of the display region itself. Herein, the second scrolling control may be a control that causes temporary scrolling movement of the display region. In the second scrolling control, a spacer that differs from a document may be displayed in a blank display part produced by the scrolling movement of the display region. Note that in the second scrolling control, at least some of the interface elements included in the display region remain operable. Each of the above scrolling controls will be discussed in further detail later.

The storage unit 130 is semiconductor memory, a hard disk drive (HDD), or the like, for example, and stores various data used by the client device 100. Furthermore, the storage unit 130 may also include a removable recording medium connected to the client device 100. The storage unit 130 stores a program by which a processor functions as the controller 120, for example. The storage unit 130 may also store the data of content to be played back by the controller 120 and output from the display unit 112 and/or an audio output unit.

The communication unit 140 is a communication device connected to a network by various wired or wireless communication schemes. For example, the communication unit 140 downloads the data of content to be output from the display unit 112 and/or an audio output unit from another device on the network. The communication unit 140 may also add another operation, such as delete or move, to content on another device on the network, according to operating input that the controller 120 acquires from the operating unit 114. Also, the communication unit 140 may download a program by which a processor functions as the controller 120 from another device on the network, and provide the program to the storage unit 130.

1-2. Display Examples

FIG. 2 is a diagram illustrating a first display example by a client device according to the first embodiment of the present disclosure. Referring to FIG. 2, a status bar 501, a menu bar 503, and a content region 505 are included on a screen 500 being displayed on the touchscreen display 110 of the client device 100. In the example illustrated in the drawing, a web page is being displayed in the content region 505. Content such as a web page is one example of that which is referred to as a document in this specification.

In the state illustrated in FIG. 2A, a web page is being displayed in the content region 505 starting from the first part (Line1). Since later parts of the web page are not being displayed in the content region 505 at this time, the user causes these parts to be displayed by scrolling the content upwards inside the content region 505 with a drag operation or flick operation on the touchscreen display 110. On the other hand, since the first part (Line1) of the web page is already being displayed in the state illustrated in FIG. 2A, from the perspective of viewing content, there is no need to scroll the content downwards any farther.

However, in the case in which the user is holding and operating the client device 100 with one hand, and the user's finger that operates the touchscreen display 110 is positioned at the bottom of the content region 505, for example, it may not be easy in some cases to perform an operation on an interface element at the edge of the web page (near Line1) displayed at the top of the content region 505. For example, in the case of a web page, there may occur operations such as selecting a link displayed among the content, pressing a button, or selecting text input. Such a phenomenon is particularly notable in the case in which the display position of the content region 505 on the touchscreen display 110 is fixed (that is, does not freely move as a window). Note that although the web page is displayed as Line1, Line2, and so on in the example illustrated in the drawing, this does not mean that the web page contains only text. The web page may also include images as well as interface elements such as links or buttons, which may be displayed in the parts illustrated in the drawing as Line1 and the like.

Accordingly, in the present embodiment, the content region 505 itself undergoes scrolling movement under control by the controller 120, as illustrated in FIG. 2B. In the illustrated example, the content region 505 undergoes scrolling movement downward, moving away from the menu bar 503 that was being displayed adjacent above. This scrolling movement, although temporary, is not transient. In other words, the state of scrolling movement undergone by the content region 505 as illustrated in FIG. 2B may be maintained until the next operation is given by the user, for example. In this state, interface elements such as links and buttons on the web page included in the content region 505 remain operable. Consequently, after causing scrolling movement of the content region 505 and moving the first part of the web page (near Line1) to the bottom of the screen 500, it is possible for the user to perform a desired operation on an interface element included in that part. As a result, it is possible to easily operate even an interface element in a part that was not easy to operate before the scrolling movement of the content region 505.

Meanwhile, a spacer 507 is displayed in the blank part between the menu bar 503 and the content region 505 produced by the scrolling movement of the content region 505. The spacer 507 is displayed distinguished from the content displayed in the content region 505, for example, and may express that downward scrolling of the content has already ended. For the spacer 507, a simple graphic or other image may be displayed, or separate content such as an advertisement may be displayed, for example. The image or content displayed as the spacer 507 may also appear to slide down from above in conjunction with the downward scrolling movement of the content region 505, for example. Alternatively, the image or content displayed as the spacer 507 may be positioned behind the content region 505, and displayed as a hidden part that appears as a result of the downward scrolling movement of the content region 505.

The scrolling movement of the content region 505 as illustrated in FIG. 2B (realized with the second scrolling control by the controller 120) may be implemented separately from the scrolling of content displayed in the content region 505 (realized with the first scrolling control by the controller 120). For example, the controller 120 may execute the second scrolling control that causes scrolling movement of the content region 505 in the case in which the operating unit 114 of the touchscreen display 110 acquires a second user operation that differs from a first user operation for scrolling content. Herein, the above first user operation and second user operation may be mutually different operations. For example, the first user operation and the second user operation may be mutually different touch operations with respect to a display region (for example, the content region 505) on the touchscreen display 110. More specifically, in the case in which the first user operation for scrolling content is a drag operation and/or a flick operation, the second user operation for causing scrolling movement of the content region 505 may be, for example, flicking on the second tap of a double tap, performing a long press with the pad of a finger, flicking after performing a long press with the pad of a finger, dragging with the pad of a finger, flicking after moving a finger up and down several times while tapping, operating a touch sensor (additionally) provided on the rear face of the client device 100, operating a touch sensor (additionally) provided on a side face of the client device 100 or at the edge of the display, or shaking the client device 100 while tapping. Note that although a long press or a drag performed with the pad of a finger may be distinguished from a long press or a drag performed with a fingertip according to differences in contact surface area, for example, in this specification these operations may all be described as touch operations. In the present embodiment, the first user operation may be a simple operation compared to the second user operation, like the several examples above. In addition, a designated operation for the purpose of scrolling movement may also include an operation with respect to a region on the touchscreen display 110 other than the content region 505, and may also include an operation with respect to an operating unit disposed on the case surrounding the touchscreen display 110 (for example, a touch sensor provided on the rear or side face of the client device 100, or at the edge of the display).

In the case in which scrolling movement of the content region 505 starts as a result of a designated operation as above, subsequent drag operations and flick operations may be treated as operations controlling the magnitude of scrolling movement of the content region 505, until a later-discussed operation that reverts the scrolling movement of the content region 505 is acquired, for example. In other words, in the case of acquiring the above designated operation, the controller 120 may switch the display control mode of the screen 500 from a mode that scrolls content inside the content region 505 to a mode that causes scrolling movement of the content region 505 itself. As a result, it may become easy for the user to place the content region 505 at a desired position via scrolling movement.

Alternatively, the controller 120 may execute the scrolling of content followed by scrolling movement of the content region 505 in response to an operation for scrolling content acquired by the operating unit 114. In this case, scrolling movement of the content region 505 may be executed automatically in the case in which the operation for scrolling content, such as a drag operation or a flick operation, for example, is continually acquired even though the content displayed in the content region 505 has reached the edge (the top edge at which Line1 is being displayed in the example illustrated in the drawing). In this case, the user does not need to switch operation from the case of scrolling content up to that point in order to cause scrolling movement of the content region 505. At this point, in cases such as when the user did not want to scroll the content region 505 as above, it is sufficient for the user to revert the scrolling of the content region 505 by executing an operation that scrolls the content in the opposite direction, for example.

A content region 505 that has undergone scrolling movement may be reverted in the case in which the user executes the above designated operation one more time or in the opposite direction, or executes an operation with respect to an interface element on the web page displayed while the content region 505 has undergone scrolling movement, for example.

FIG. 3 is a diagram illustrating a second display example by a client device according to the first embodiment of the present disclosure. Referring to FIG. 3, a status bar 601, a menu bar 603, and a content list region 605 are included on a screen 600 being displayed on the touchscreen display 110 of the client device 100. In the example illustrated in the drawing, thumbnails of image content are being displayed in the content list region 605. The thumbnails are displayed with scrolling, since the thumbnails do not fit in the content list region 605 provided by the display unit 112 of the touchscreen display 110. Such a content list is another example of that which is referred to as a document in this specification.

In the state illustrated in FIG. 3A, the first part of the thumbnails (P1 to P9) are being displayed in the content list region 605. Since later parts of the thumbnails (P10 onwards) are not being displayed in the content list region 605 at this time, the user causes these thumbnails to be displayed by scrolling the content list upwards with a drag operation or flick operation on the touchscreen display 110. On the other hand, since the first thumbnail (P1) is being displayed in the state illustrated in FIG. 3A, from the perspective of viewing thumbnails, there is no need to scroll the content list downwards any farther.

However, in the case in which the user is holding and operating the client device 100 with one hand, and the user's finger that operates the touchscreen display 110 is positioned at the bottom of the content list region 605, for example, it may not be easy in some cases to perform some kind of operation on a thumbnail (P1 to P3, for example) display at the top of the content list region 605. For example, in the case of thumbnails of image content, there may occur operations such as selecting a thumbnail to display, delete, or tag image content. Also, as another example, if titles or thumbnail images of music content are displayed in a content list region, there may occur operations such as selecting a title or image to play, delete, or tag music content.

Accordingly, in the present embodiment, the content list region 605 itself undergoes scrolling movement under control by the controller 120, as illustrated in FIG. 3B. In the illustrated example, the content list region 605 undergoes scrolling movement downward, moving away from the menu bar 603 that was being displayed adjacent above. Similarly to the first display example above, this scrolling movement, although temporary, is not transient. In other words, the state of scrolling movement undergone by the content list region 605 as illustrated in FIG. 3B may be maintained until the next operation is given by the user, for example. In this state, thumbnails included in the content list region 605 remain operable (since various operations related to image content are possible, thumbnails may be said to be one type of interface element). Consequently, after causing scrolling movement of the content list region 605 and moving the first thumbnails (P1 to P3, for example) to the bottom of the screen, it is possible for the user to perform a desired operation on these thumbnails. As a result, it is possible to easily operate even a thumbnail that was not easy to operate before the scrolling movement of the content list region 605.

Meanwhile, a spacer 607 is displayed in the blank part between the menu bar 603 and the content list region 605 produced by the scrolling movement of the content list region 605. The spacer 607 is displayed distinguished from the thumbnails displayed in the content list region 605, for example, and may express that downward scrolling of the content list has already ended. For the spacer 607, a simple graphic or other image may be displayed, or separate content such as an advertisement may be displayed, for example. The image or content displayed as the spacer 607 may also appear to slide down from above in conjunction with the downward scrolling movement of the content list region 605, for example. Alternatively, the image or content displayed as the spacer 607 may be positioned behind the content list region 605, and displayed as a hidden part that appears as a result of the downward scrolling movement of the content list region 605.

Similarly to the first display example above, the scrolling movement of the content list region 605 as illustrated in FIG. 3B may also be executed separately from the scrolling of a content list displayed in the content list region 605. Accordingly, for example, the controller 120 may execute scrolling movement of the content list region 605 in the case in which the operating unit 114 of the touchscreen display 110 acquires a designated operation that differs from an operation for scrolling the content list. Since an example of an operation for the scrolling of a content list and an operation for the scrolling movement of a content list region is similar to the example of an operation for the scrolling of content and an operation for the scrolling movement of a content region in the first display example above, duplicate description thereof will be omitted herein.

In the case in which scrolling movement of the content list region 605 starts as a result of a designated operation, subsequent drag operations and flick operations may be treated as operations controlling the magnitude of scrolling movement of the content list region 605, until a later-discussed operation that reverts the scrolling movement of the content list region 605 is acquired, for example. In other words, in the case of acquiring the above designated operation, the controller 120 may switch the display control mode of the screen 600 from a mode that scrolls thumbnails or the like inside the content list region 605 to a mode that causes scrolling movement of the content list region 605 itself. As a result, it may become easy to make adjustments so that the content list region 605 moves to a desired position by scrolling movement.

Alternatively, the controller 120 may execute the scrolling of a content list followed by scrolling movement of the content list region 605 in response to an operation for scrolling a content list acquired by the operating unit 114. In this case, scrolling movement of the content list region 605 may be executed automatically in the case in which the operation for scrolling the content list, such as a drag operation or a flick operation, for example, is continually acquired even though the thumbnails displayed in the content list region 605 have reached the beginning (P1 in the example illustrated in the drawing). In this case, the user does not need to switch operation from the case of a scrolling content list up to that point in order to cause scrolling movement of the content list region 605. At this point, in cases such as when the user did not want to scroll the content list region 605 as above, it is sufficient for the user to revert the scrolling of the content list region 605 by executing an operation that scrolls the content list in the opposite direction, for example.

A content list region 605 that has undergone scrolling movement may be reverted in the case in which the user executes the above designated operation one more time or in the opposite direction, or executes an operation with respect to a thumbnail displayed while the content list region 605 has undergone scrolling movement, for example.

2. Second Embodiment

Next, a second embodiment of the present disclosure will be described with reference to FIGS. 4 and 5. The present embodiment differs from the foregoing first embodiment in that a content region or a content list region undergoes scrolling movement together with a menu bar. Note that since all other points are similar to the first embodiment, duplicate description thereof will be omitted.

FIG. 4 is a diagram illustrating a first display example by a client device according to the second embodiment of the present disclosure. Referring to FIG. 4, a status bar 501, a menu bar 503, and a content region 505 are included on a screen 500 being displayed on the touchscreen display 110 of the client device 100. In the example illustrated in the drawing, a web page is being displayed in the content region 505.

In the state illustrated in FIG. 4A, a web page is being displayed in the content region 505. Operations performed on the web page displayed in the content region 505, such as back, forward, reload, stop, and add bookmark, for example, may be acquired by interface elements such as buttons placed on the menu bar 503. In other words, the menu bar 503 may be referred to as an interface element placement region in which are placed interface elements that accept operations related to the web page. However, in the case in which the user is holding and operating the client device 100 with one hand, and the user's finger that operates the touchscreen display 110 is positioned at the bottom of the content region 505, for example, it may not be easy in some cases to perform an operation on an interface element placed on the menu bar 503 above.

Accordingly, in the present embodiment, the menu bar 503 undergoes scrolling movement together with the content region 505 under control by the controller 120, as illustrated in FIGS. 4B and 4C. In the illustrated example, the menu bar 503 undergoes scrolling movement downward, moving away from the status bar 501 that was being displayed adjacent above. This scrolling movement, although temporary, is not transient. In other words, the scrolled state of the menu bar 503 as illustrated in FIG. 4B or FIG. 4C may be maintained until the next operation is given by the user, for example. In this state, interface elements such as buttons included on the menu bar 503 remain operable. Consequently, after moving the menu bar 503 to the bottom of the screen 500, it is possible for the user to perform a desired operation on an interface element included on the menu bar 503. In other words, the user is able to easily operate an interface element on the menu bar 503 without changing his or her grip on the client device 100, for example.

Meanwhile, a spacer 507 is displayed in the blank part between the status bar 501 and the menu bar 503 produced by the scrolling movement of the menu bar 503 and the content region 505. For the spacer 507, a simple graphic or other image may be displayed, or separate content such as an advertisement may be displayed, for example. Alternatively, additional interface elements not included on the menu bar 503 may be displayed as the spacer 507. The image, content, or interface elements displayed as the spacer 507 may also appear to slide down from above in conjunction with the downward scrolling movement of the menu bar 503, for example. Alternatively, the image, content, or interface elements displayed as the spacer 507 may be positioned behind the menu bar 503 and the content region 505, and displayed as a hidden part that appears as a result of the downward scrolling movement of the menu bar 503.

The scrolling movement of the menu bar 503 as illustrated in FIGS. 4B and 4C may also be executed separately from the scrolling of content displayed in the content region 505. For example, the controller 120 may execute scrolling movement of the menu bar 503 in the case in which the operating unit 114 of the touchscreen display 110 acquires a designated operation that differs from an operation for scrolling the content. Since an example of an operation for the scrolling of content and an operation for the scrolling movement of a menu bar is similar to the example of an operation for the scrolling of content and an operation for the scrolling movement of a content region in the foregoing first embodiment, duplicate description thereof will be omitted herein.

Furthermore, for the above designated operation, the controller 120 may respectively set an operation for causing scrolling movement of the content region 505 and an operation for causing scrolling movement of the menu bar 503, and selectively execute scrolling movement of these regions. For example, the controller 120 may set an operation of flicking after a double tap as the operation for scrolling movement of the content region 505, and set an operation of flicking after a long press with the pad of a finger as the operation for scrolling movement of the menu bar 503.

In the case in which scrolling movement of the menu bar 503 starts as a result of a designated operation, subsequent drag operations and flick operations may be treated as operations controlling the magnitude of scrolling movement of the menu bar 503, until a later-discussed operation that reverts the scrolling movement of the menu bar 503 is acquired, for example. In other words, in the case of acquiring the above designated operation, the controller 120 may switch the display control mode of the screen 500 from a mode that scrolls content inside the content region 505 to a mode that causes scrolling movement of the menu bar 503 and the content region 505. As a result, it may become easy for the user to place the menu bar 503 at a desired position via scrolling movement.

As a result of the user placing the menu bar 503 at a desired position with an operation like the above, in some cases the user's next operation may be acquired in a state in which the menu bar 503 is displayed at the bottom edge of the screen 500, and the content region 505 is no longer displayed, as in FIG. 4C. Also, the user's next operation may be acquired in a state in which the menu bar 503 is displayed in the approximate center of the screen 500, and the content region 505 is displayed below, as in FIG. 4B. At this point, since the user is conceivably executing scrolling movement of the menu bar 503 in order to operate the menu bar 503, interface elements being displayed in the content region 505 may also be disabled. Alternatively, interface elements displayed in the content region 505 may also remain operable in order to raise the user's freedom of operation.

A menu bar 503 that has undergone scrolling movement may be reverted together with the content region 505 in the case in which the user executes the above designated operation one more time or in the opposite direction, or executes an operation with respect to an interface element included on the menu bar 503 while the menu bar 503 has undergone scrolling movement, for example.

FIG. 5 is a diagram illustrating a second display example by a client device according to the second embodiment of the present disclosure. Referring to FIG. 5, a status bar 601, a menu bar 603, and a content list region 605 are included on a screen 600 being displayed on the touchscreen display 110 of the client device 100. In the example illustrated in the drawing, thumbnails of image content are being displayed in the content list region 605.

In the state illustrated in FIG. 5A, the first part of the thumbnails (P1 to P9) are being displayed in the content list region 605. Operations performed on these thumbnails, such as play, delete, and move, for example, may be acquired by interface elements such as buttons displayed on the menu bar 603. However, in the case in which the user is holding and operating the client device 100 with one hand, and the user's finger that operates the touchscreen display 110 is positioned at the bottom of the content list region 605, for example, it may not be easy in some cases to perform an operation on an interface element placed on the menu bar 603 above.

Accordingly, in the present embodiment, the menu bar 603 undergoes scrolling movement together with the content list region 605 under control by the controller 120, as illustrated in FIGS. 5B and 5C. In the illustrated example, the menu bar 603 undergoes scrolling movement downward, moving away from the status bar 601 that was being displayed adjacent above. Similarly to the first display example above, this scrolling movement, although temporary, is not transient. In other words, the scrolled state of the menu bar 603 as illustrated in FIG. 5B and FIG. 5C may be maintained until the next operation is given by the user, for example. In this state, interface elements such as buttons displayed on the menu bar 603 remain operable. Consequently, after moving the menu bar 603 to the bottom of the screen 600, it is possible for the user to perform a desired operation on an interface element included on the menu bar 603. As a result, the user is able to easily operate an interface element on the menu bar 603 without changing his or her grip on the client device 100, for example.

Meanwhile, a spacer 607 is displayed in the blank part between the status bar 601 and the menu bar 603 produced by the scrolling movement of the content list region 605 and the menu bar 603. For the spacer 607, a simple graphic or other image may be displayed, or separate content such as an advertisement may be displayed, for example. Alternatively, additional interface elements not included on the menu bar 603 may be displayed as the spacer 607. The image, content, or interface elements displayed as the spacer 607 may also appear to slide down from above in conjunction with the downward scrolling movement of the menu bar 603, for example. Alternatively, the image, content, or interface elements displayed as the spacer 607 may be positioned behind the menu bar 603 and the content list region 605, and displayed as a hidden part that appears as a result of the downward scrolling movement of the menu bar 603.

Similarly to the first display example above, the scrolling movement of the menu bar 603 as illustrated in FIGS. 5B and 5C may also be executed separately from the scrolling of a content list displayed in the content list region 605. Accordingly, for example, the controller 120 may execute scrolling movement of the menu bar 603 in the case in which the operating unit 114 of the touchscreen display 110 acquires a designated operation that differs from an operation for scrolling the content list. Since an example of an operation for the scrolling of content and an operation for the scrolling movement of a menu bar is similar to the example of an operation for the scrolling of content and an operation for the scrolling movement of a content region in the foregoing first embodiment, duplicate description thereof will be omitted herein.

Furthermore, similarly to the first display example above, the controller 120 may respectively set an operation for causing scrolling movement of the content list region 605 and an operation for causing scrolling movement of the menu bar 603, and selectively execute scrolling movement of these regions. Also, in the case in which scrolling movement of the menu bar 603 starts as a result of a designated operation, subsequent drag operations and flick operations may be treated as operations controlling the magnitude of scrolling movement of the menu bar 603, until a later-discussed operation that reverts the scrolling movement of the menu bar 603 is acquired, for example.

As a result of the user placing the menu bar 603 at a desired position with an operation like the above, in some cases the user's next operation may be acquired in a state in which the menu bar 603 is displayed at the bottom edge of the screen 600, and the content list region 605 is no longer displayed, as in FIG. 5C. Also, the user's next operation may be acquired in a state in which the menu bar 603 is displayed in the approximate center of the screen 600, and the content list region 605 is displayed below, as in FIG. 5B. At this point, since the user is conceivably executing scrolling movement of the menu bar 603 in order to operate the menu bar 603, operations on thumbnails being displayed in the content list region 605 may also be disabled. Alternatively, thumbnails displayed in the content list region 605 may also remain operable in order to raise the user's freedom of operation.

A menu bar 603 that has undergone scrolling movement may be reverted in the case in which the user executes the above designated operation one more time or in the opposite direction, or executes an operation with respect to an interface element included on the menu bar 603 while the menu bar 603 has undergone scrolling movement, for example.

3. Third Embodiment

Next, a third embodiment of the present disclosure will be described with reference to FIGS. 6 and 7. The present embodiment differs from the foregoing first and second embodiments in that a content region or a content list region undergoes scrolling movement together with a menu bar and a status bar. Note that since all other points are similar to the first or second embodiment, duplicate description thereof will be omitted.

FIG. 6 is a diagram illustrating a first display example by a client device according to the third embodiment of the present disclosure. Referring to FIG. 6, a status bar 501, a menu bar 503, and a content region 505 are included on a screen 500 being displayed on the touchscreen display 110 of the client device 100. In the example illustrated in the drawing, a web page is being displayed in the content region 505.

In the state illustrated in FIG. 6A, a web page is being displayed in the content region 505. Operations performed on the web page displayed in the content region 505, such as back, forward, reload, stop, and add bookmark, for example, may be acquired by interface elements such as buttons placed on the menu bar 503. Also, status notifications indicating received messages, software updates, and the like regarding the overall system of the client device 100 may be referenced by selecting the status bar 501, for example. However, in the case in which the user is holding and operating the client device 100 with one hand, and the user's finger that operates the touchscreen display 110 is positioned at the bottom of the content region 505, for example, it may not be easy in some cases to perform an operation on an interface element placed on the menu bar 503 above, or select the status bar 501 placed even farther above.

Accordingly, in the present embodiment, the status bar 501 undergoes scrolling movement together with the menu bar 503 and the content region 505 under control by the controller 120, as illustrated in FIGS. 6B and 6C. In the illustrated example, the status bar 501 undergoes scrolling movement downward, moving away from the top edge of the screen 500. This scrolling movement, although temporary, is not transient. In other words, the scrolled state of the status bar 501 as illustrated in FIG. 6B or FIG. 6C may be maintained until the next operation is given by the user, for example. While in this state, the status bar 501 remains selectable. In addition, interface elements such as buttons included on the menu bar 503 may also remain operable. Consequently, after moving the status bar 501 and the menu bar 503 to the bottom of the screen 500, it is possible for the user to select the status bar 501 to display a notification, or perform a desired operation on an interface element included on the menu bar 503. In other words, the user is able to easily operate an interface element on the menu bar 503 or select the status bar 501, without changing his or her grip on the client device 100, for example.

Meanwhile, a spacer 507 is displayed in the blank part above the status bar 501 produced by the scrolling movement of the status bar 501, the menu bar 503, and the content region 505. For the spacer 507, a simple graphic or other image may be displayed, or separate content such as an advertisement may be displayed, for example. Alternatively, additional interface elements not included on the menu bar 503 may be displayed as the spacer 507. The image, content, or interface elements displayed as the spacer 507 may also appear to slide down from above in conjunction with the downward scrolling movement of the status bar 501, for example. Alternatively, the image, content, or interface elements displayed as the spacer 507 may be positioned behind the status bar 501, the menu bar 503, and the content region 505, and displayed as a hidden part that appears as a result of the downward scrolling movement of the status bar 501.

The scrolling movement of the status bar 501 as illustrated in FIGS. 6B and 6C may also be executed separately from the scrolling of content displayed in the content region 505. For example, the controller 120 may execute scrolling movement of the status bar 501 in the case in which the operating unit 114 of the touchscreen display 110 acquires a designated operation that differs from an operation for scrolling the content. Since an example of an operation for the scrolling of content and an operation for the scrolling movement of a status bar is similar to the example of an operation for the scrolling of content and an operation for the scrolling movement of a content region in the foregoing first embodiment, duplicate description thereof will be omitted herein.

Furthermore, for the above designated operation, the controller 120 may respectively set an operation for causing scrolling movement of the content region 505 and an operation for causing scrolling movement of the status bar 501, and selectively execute scrolling movement of these regions. For example, the controller 120 may set an operation of flicking after a double tap as the operation for scrolling movement of the content region 505, and set an operation of flicking after a long press with the pad of a finger as the operation for scrolling movement of the status bar 501.

In the case in which scrolling movement of the status bar 501 starts as a result of a designated operation, subsequent drag operations and flick operations may be treated as operations controlling the magnitude of scrolling movement of the status bar 501, until a later-discussed operation that reverts the scrolling movement of the status bar 501 is acquired, for example. In other words, in the case of acquiring the above designated operation, the controller 120 may switch the display control mode of the screen 500 from a mode that scrolls content inside the content region 505 to a mode that causes scrolling movement of the status bar 501, the menu bar 503, and the content region 505. As a result, it may become easy for the user to place the status bar 501 or the menu bar 503 at a desired position via scrolling movement.

As a result of the user placing the status bar 501 or the menu bar 503 at a desired position with an operation like the above, in some cases the user's next operation may be acquired in a state in which the status bar 501 and the menu bar 503 are displayed at the bottom edge of the screen 500, and the content region 505 is no longer displayed, as in FIG. 6C. Also, the user's next operation may be acquired in a state in which the status bar 501 and the menu bar 503 are displayed in the approximate center of the screen 500, and the content region 505 is displayed below, as in FIG. 6B. At this point, since the user is conceivably executing scrolling movement of the status bar 501 in order to operate the status bar 501 or the menu bar 503, interface elements being displayed in the content region 505 may also be disabled. Alternatively, interface elements displayed in the content region 505 may also remain operable in order to raise the user's freedom of operation.

A status bar 501 and a menu bar 503 that have undergone scrolling movement may be reverted together with the content region 505 in the case in which the user executes the above designated operation one more time or in the opposite direction, or ends viewing of a notification displayed in the status bar 501 or executes an operation with respect to an interface element included on the menu bar 503 while the status bar 501 and the menu bar 503 have undergone scrolling movement, for example.

FIG. 7 is a diagram illustrating a second display example by a client device according to the third embodiment of the present disclosure. Referring to FIG. 7, a status bar 601, a menu bar 603, and a content list region 605 are included on a screen 600 being displayed on the touchscreen display 110 of the client device 100. In the example illustrated in the drawing, thumbnails of image content are being displayed in the content list region 605.

In the state illustrated in FIG. 7A, the first part of the thumbnails (P1 to P9) are being displayed in the content list region 605. Operations performed on these thumbnails, such as play, delete, and move, for example, may be acquired by interface elements such as buttons displayed on the menu bar 603. Also, notifications indicating received messages, software updates, and the like regarding the overall system of the client device 100 may be referenced by selecting the status bar 601, for example. However, in the case in which the user is holding and operating the client device 100 with one hand, and the user's finger that operates the touchscreen display 110 is positioned at the bottom of the content list region 605, for example, it may not be easy in some cases to perform an operation on an interface element placed on the menu bar 603 above, or select the status bar 601 placed even farther above.

Accordingly, in the present embodiment, the status bar 601 undergoes scrolling movement together with the menu bar 603 and the content list region 605 under control by the controller 120, as illustrated in FIGS. 7B and 7C. In the illustrated example, the status bar 601 undergoes scrolling movement downward, moving away from the top edge of the screen 600. Similarly to the first display example above, this scrolling movement, although temporary, is not transient. In other words, the scrolled state of the status bar 601 as illustrated in FIG. 7B or FIG. 7C may be maintained until the next operation is given by the user, for example. While in this state, the status bar 601 remains selectable. In addition, interface elements such as buttons included on the menu bar 603 may also remain operable. Consequently, after moving the status bar 601 and the menu bar 603 to the bottom of the screen 600, it is possible for the user to select the status bar 601 to display a notification, or perform a desired operation on an interface element included on the menu bar 603. In other words, the user is able to easily operate an interface element on the menu bar 603 or select the status bar 601, without changing his or her grip on the client device 100, for example.

Meanwhile, a spacer 607 is displayed in the blank part above the status bar 601 produced by the scrolling movement of the status bar 601, the menu bar 603, and the content list region 605. For the spacer 607, a simple graphic or other image may be displayed, or separate content such as an advertisement may be displayed, for example. Alternatively, additional interface elements not included on the menu bar 603 may be displayed as the spacer 607. The image, content, or interface elements displayed as the spacer 607 may also appear to slide down from above in conjunction with the downward scrolling movement of the status bar 601, for example. Alternatively, the image, content, or interface elements displayed as the spacer 607 may be positioned behind the status bar 601, the menu bar 603, and the content list region 605, and displayed as a hidden part that appears as a result of the downward scrolling movement of the status bar 601.

Similarly to the first display example above, the scrolling movement of the status bar 601 as illustrated in FIGS. 7B and 7C may also be executed separately from the scrolling of a content list displayed in the content list region 605. For example, the controller 120 may execute scrolling movement of the status bar 601 in the case in which the operating unit 114 of the touchscreen display 110 acquires a designated operation that differs from an operation for scrolling the content list. Since an example of an operation for the scrolling of a content list and an operation for the scrolling movement of a status bar is similar to the example of an operation for the scrolling of content and an operation for the scrolling movement of a content region in the foregoing first embodiment, duplicate description thereof will be omitted herein.

Furthermore, similarly to the first display example above, the controller 120 may respectively set an operation for causing scrolling movement of the content list region 605 and an operation for causing scrolling movement of the status bar 601, and selectively execute scrolling movement of these regions. Also, in the case in which scrolling movement of the status bar 601 starts as a result of a designated operation, subsequent drag operations and flick operations may be treated as operations controlling the magnitude of scrolling movement of the status bar 601, until a later-discussed operation that reverts the scrolling movement of the status bar 601 is acquired, for example.

As a result of the user placing the status bar 601 or the menu bar 603 at a desired position with an operation like the above, in some cases the user's next operation may be acquired in a state in which the status bar 601 and the menu bar 603 are displayed at the bottom edge of the screen 600, and the content list region 605 is no longer displayed, as in FIG. 7C. Also, the user's next operation may be acquired in a state in which the status bar 601 and the menu bar 603 are displayed in the approximate center of the screen 600, and the content list region 605 is displayed below, as in FIG. 7B. At this point, since the user is conceivably executing scrolling movement of the status bar 601 in order to operate the status bar 601 or the menu bar 603, operations on thumbnails being displayed in the content list region 605 may also be disabled. Alternatively, thumbnails displayed in the content list region 605 may also remain operable in order to raise the user's freedom of operation.

A status bar 601 and a menu bar 603 that have undergone scrolling movement may be reverted together with the content list region 605 in the case in which the user executes the above designated operation one more time or in the opposite direction, or ends viewing of a notification displayed in the status bar 601 or executes an operation with respect to an interface element included on the menu bar 603 while the status bar 601 and the menu bar 603 have undergone scrolling movement, for example.

4. Fourth Embodiment

Next, a fourth embodiment of the present disclosure will be described with reference to FIG. 8. In the present embodiment, the scrolling movement starting from a content region (or a content list region), the scrolling movement starting from a menu bar, and the scrolling movement starting from a status bar in the foregoing first through third embodiments are used differently according to the support state of the operating system (OS) of the client device 100 or an application displayed on-screen.

FIG. 8 is a flowchart illustrating an example of a process by a client device according to the fourth embodiment of the present disclosure. First, the operating unit 114 of the client device 100 acquires a designated operation indicating scrolling movement that is not the scrolling of content (or a content list) (step S101). Herein, the designated operation may be, as discussed earlier, flicking on the second tap of a double tap, performing a long press with the pad of a finger, flicking after performing a long press with the pad of a finger, dragging with the pad of a finger, flicking after moving a finger up and down several times while tapping, operating a touch sensor (additionally) provided on the rear face of the client device 100, operating a touch sensor (additionally) provided on a side face of the client device 100 or at the edge of the display, or shaking the client device 100 while tapping, for example.

At this point, in the case of determining that the operating unit 114 has acquired the designated operation, the controller 120 may control the display unit 112 to display an effect indicating that a separate scrolling display mode has started. For example, an effect like peeling paper may be displayed in the portions undergoing scrolling movement on-screen (for example, the content region 505 in the example of FIG. 2, the menu bar 503 in the example of FIG. 4, or the status bar 501 in the example of FIG. 6). Also, an effect may be displayed in which these portions are reduced slightly and appear to be floating. These effects may be displayed not only at the start, but also during the scrolling movement.

Next, a determination of whether or not the OS supports a scrolling movement function is made (step S103), and if the OS supports the function (YES), scrolling movement starting from the status bar like in the third embodiment is executed (step S105). In the present embodiment, since the status bar is displayed by a function of the OS, OS support of a scrolling movement function may be a condition for realizing scrolling movement starting from the status bar. Obviously, scrolling movement starting from the menu bar or scrolling movement starting from the content region (or content list region) may also be executed, even in the case in which the OS supports the function.

Conversely, in the case in which the OS does not support the function in the determination of step S103 (NO), a determination of whether or not the application being displayed on-screen supports a scrolling movement function is made (step S107). At this point, if the application supports the function (YES), scrolling movement starting from the menu bar like in the second embodiment is executed (step S109). In the present embodiment, since the menu bar is displayed by a function of the application, application support of a scrolling movement function may be a condition for realizing scrolling movement starting from the menu bar. Obviously, scrolling movement starting from the content region (or content list region) may also be executed, even in the case in which the application supports the function.

Conversely, in the case in which the application does not support the function in the determination of step S107 (NO), scrolling movement starting from the content region (or content list region) like in the first embodiment is executed (step S111). At this point, the controller 120 adds a dummy content portion, advertising, or the like to be displayed as a spacer at the beginning of the content (or content list), for example, such that this content portion or advertising is displayed following the ordinary scrolling of the content (or content list).

5. Other Embodiments

5-1. Upward Scrolling Movement

FIGS. 9 and 10 are diagrams illustrating examples of upward scrolling movement according to another embodiment of the present disclosure. FIGS. 9A to 9C illustrate an example of a content display, while FIGS. 10A to 10C illustrate an example of a content list display. The foregoing first through third embodiments are described by taking as an example the case in which the user's finger operating the touchscreen display 110 is positioned at the bottom of the content region 505 (or the content list region 605). Similarly, usability improvement using upward scrolling movement may also be attempted in the case in which the user's finger is positioned at the top of the content region 505 (or the content list region 605).

For example, as illustrated in the examples of FIGS. 9A and 10A, the content region 505 (or the content list region 605) may undergo upward scrolling movement to place interface elements or thumbnails closer to a range easily operated by the user. Similarly, as illustrated in the examples of FIGS. 9B and 10B, the menu bar 503 or 603 may also undergo upward scrolling movement in the case in which the menu bar 503 or 603 is displayed at the bottom edge rather than the top edge of the screen 500 or 600. Also, as illustrated in the examples of FIGS. 9C and 10C, the status bar 501 or 601 may also undergo upward scrolling movement in the case in which the status bar 501 or 601 is displayed at the bottom edge of the screen 500 or 600.

5-2. Automatic Stopping and Spacer Display

FIG. 11 is a diagram illustrating an example of automatic stopping and spacer display according to another embodiment of the present disclosure. In the illustrated example, scrolling movement starting from the status bar 601 is executed. In FIG. 11A, thumbnails (P10 to P17) of image content displayed in the content list region 605 are scrolled, without starting a mode for scrolling movement of the status bar 601. At this point, if a designated operation as discussed above is acquired, such as a long press with the pad of a finger, scrolling with the pad of a finger, or shaking the client device 100 while tapping, for example, the controller 120 starts the mode for scrolling movement of the status bar 601.

FIG. 11B is a display example of when the mode for scrolling movement of the status bar 601 is started. At this point, the status bar 601, the menu bar 603, and the content list region 605 move slightly downward while keeping the displayed content (like when captured). The spacer 607 is displayed in the blank part produced by the movement. In the illustrated example, the spacer 607 may be an image like a string by which the status bar 601 hangs from the top edge of the screen 600. At the time of FIG. 11B, this string is very slack.

FIG. 11C is a display example while scrolling movement of the status bar 601 is in progress. At this point, the status bar 601, the menu bar 603, and the content list region 605 are moving downward while continuing to keep the displayed content at the time of FIG. 11A. As discussed above, even in this state it is still possible to select the status bar 601 or operate an interface element included on the menu bar 603. Also, the string being displayed as the spacer 607 is gradually losing slack to reflect that the distance has widened between the top edge of the screen 600 and the status bar 601.

FIG. 11D is a display example of when scrolling movement of the status bar 601 has stopped. At this point, the status bar 601 and the menu bar 603 have moved close to the bottom edge of the screen 600, and are estimated to be at a position that is sufficiently easily to operate with a user's finger positioned at the bottom of the screen 600, for example. Consequently, the controller 120 may also set this position as a limit point for the scrolling movement of the status bar 601. At this point, the string being displayed as the spacer 607 is being displayed in a taut state to reflect that the downward movement of the status bar 601 has reached the limit.

In the illustrated example, the scrolling movement of the status bar 601 and the menu bar 603 may be stopped at a suitable position without user adjustment, as a result of the controller 120 of the client device 100 automatically determining a travel amount for the scrolling movement of the status bar 601. Herein, the travel amount of the scrolling movement may be determined according to the display size of interface elements that remain operable, or in other words, the display size of the status bar 601 or interface elements displayed on the menu bar 603 in the above example. Also, by displaying an image expressing the relationship between an automatically determined travel amount and the current travel amount, like the string in the above example, the user is able to intuitively recognize how far the scrolling movement has advanced. Obviously, similar control and display is likewise possible for scrolling movement of the menu bar 603 or the content list region 605, as well as the scrolling movement of respective regions on the screen 500.

5-3. Display when Reverting

FIG. 12 is a diagram illustrating a display example when reverting the scrolling movement illustrated in FIG. 11. FIG. 12A is the same display as FIG. 11D, but if at this point a designated operation for reverting scrolling movement is acquired, such as an operation of tapping and then flicking upward, for example, the controller 120 starts a control for reverting the scrolling movement of the status bar 601. In the illustrated example, the scrolling movement is automatically reverted by the above designated operation. FIG. 12B illustrates a midway state. Unlike the example of FIG. 11C, for example, the string displayed as the spacer 607 remains in a taut state, and movement may be expressed as though the status bar 601 is being dragged upward, for example.

As illustrated in FIG. 12C, when the status bar 601 moves up to the top edge of the screen 600, the mode for scrolling movement of the status bar 601 ends, and subsequently, the scrolling display of the thumbnails displayed in the content list region 605 is resumed. Note that although in the above example the scrolling movement is automatically reverted by the operation in FIG. 12A, in another example, the scrolling movement may be reverted manually by the user executing an upward drag operation or flick operation until reaching the state in FIG. 12C. In this case, it is also possible to stop the upward operation partway through, and again return to the state in FIG. 12A. Thus, the display of the spacer 607 in FIG. 12B may be a somewhat slack string similar to FIG. 11C to express that the status bar 601 is movable both upwards and downwards.

FIG. 13 is a diagram illustrating a another display example when reverting the scrolling movement illustrated in FIG. 11. FIG. 13A is the same display as FIG. 11D, but at this point an operation selecting the status bar 601 is acquired. As discussed earlier, since notifications indicating received messages, software updates, and the like are displayed on the status bar 601, if the status bar 601 is selected, a status screen 609 as illustrated in FIG. 13B may be referenced. In the illustrated example, by selecting a close button 611 displayed on the status screen 609, the display of the status screen 609 ends, and in addition, the display position of the status bar 601 reverts back as illustrated in FIG. 13C, and the scrolling movement mode ends.

FIG. 14 is a diagram illustrating yet another display example when reverting the scrolling movement illustrated in FIG. 11. FIG. 14A is the same display as FIG. 11D, but at this point an operation via an interface element included on the menu bar 603 produces a screen transition within an application, or in other words, a change in the display of a document. In the illustrated example, a transition to a map display screen 650 as illustrated in FIG. 14B is being executed, and at this point the scrolling movement of the status bar 601 is reverted back. The position of the status bar 601 may revert back immediately, or revert over a designated amount of time while displaying an animation or the like. On the other hand, although a screen transition is not produced in the display of FIG. 14A even in the case in which an operation, such as deleting content, for example, is executed on a thumbnail of image content displayed in the content list region 605 via an interface element included on the menu bar 603, the scrolling movement of the status bar 601 may revert back as illustrated in FIG. 14C.

5-4. Display in the Case of a Horizontal Screen

FIG. 15 is a diagram illustrating a display example of a horizontal screen according to another embodiment of the present disclosure. In the example in FIG. 15A, when a contact region (Touch) exists on the right side of a horizontal screen 700, the displayed content undergoes scrolling movement to the right, and a spacer 707 is displayed in the emptied part. Also, in the example in FIG. 15B, when a contact region (Touch) exists on the left side of the horizontal screen 700, the displayed content undergoes scrolling movement to the left, and a spacer 707 is displayed in the emptied part. In this way, the embodiment of the present disclosure discussed above is also applicable to a horizontal screen similarly to a vertical screen in a client device 100 such as a smartphone.

5-5. Display in the Case of a Large Screen

FIG. 16 is a diagram illustrating a display example of a large screen according to another embodiment of the present disclosure. In the example in FIG. 16A, when a contact region (Touch) exists in the lower-right of a large screen 800, the displayed content undergoes scrolling movement down and to the right, and a spacer 807 is displayed in the emptied L-shaped part. Also, in the example in FIG. 16B, when a contact region (Touch) exists in the lower-left of the large screen 800, the displayed content undergoes scrolling movement down and to the left, and a spacer 807 is displayed in the emptied L-shaped part. In this way, the embodiment of the present disclosure discussed above is also applicable to a large screen the may be scrolled both vertically and horizontally in a client device 100 such as a tablet. In this case, the travel direction of the scrolling movement may be determined according to a position on a touchscreen display or on a case near a touchscreen display at which a designated user operation was executed, as in the above examples.

6. Supplemental Remarks

In the foregoing embodiment, display control for a client device is executed internally within the client device, such that the client device functions as the display control device. However, an embodiment of the present disclosure is not limited to such an example. For example, a server that communicates with a client device via a network may also provide the function of display control for the client device. In this case, one or multiple server devices constituting the server function as the display control device.

Embodiments of the present disclosure encompass a display control device (a client device or a server device) as described in the foregoing, a system, an information processing method executed by a display device or system, a program for causing a display control device to function, and a non-transient tangible medium storing a program, for example.

The foregoing thus describes a preferred embodiment of the present disclosure in detail and with reference to the attached drawings. However, the technical scope of the present disclosure is not limited to such examples. It is clear to persons ordinarily skilled in the technical field of the present disclosure that various modifications or alterations may occur insofar as they are within the scope of the technical ideas stated in the claims, and it is to be understood that such modifications or alterations obviously belong to the technical scope of the present disclosure.

Additionally, the present technology may also be configured as below.

(1) An information processing system, comprising: circuitry configured to cause a first scrolling of a displayed content region within boundaries thereof in response to a first user operation, and cause a second scrolling of the displayed content region beyond the boundaries thereof in response to a second user operation.

(2) The information processing system of (1), wherein the first user operation and the second user operation are different.

(3) The information processing system of (2), wherein the first user operation includes fewer gestures than the second user operation.

(4) The information processing system of any one of (1) to (3), wherein an operation item in the content region remains active after the second scrolling of the content region.

(5) The information processing system of (4), wherein the content region is scrolled to a position within the boundaries thereof in response to operation of the operation item.

(6) The information processing system of any one of (1) to (5), wherein after the second scrolling an area beyond the boundaries of the content region is displayed differently from the content region to distinguish the area beyond the boundaries of the content region from the content region.

(7) The information processing system of (6), wherein the content region is part of a graphical user interface that further includes a menu region and a status region.

(8) The information processing system of (7), wherein the status region and the menu region remain at a fixed position in the graphical user interface during both the first and the second user operations.

(9) The information processing system of any one of (6) to (7), wherein the area beyond the boundaries of the content region includes an image.

(10) The information processing system of any one of (6) to (9), wherein the area beyond the boundaries includes an advertisement.

(11) The information processing system of any one of (9) to (10), wherein the image included in the area beyond the boundaries of the content region is positioned behind the content region such that scrolling the content region beyond the boundaries thereof reveals a portion of the image.

(12) The information processing system of any one of (1) to (11), wherein user operations after the second user operation control a magnitude of the second scrolling.

(13) The information processing system of (12), wherein the second scrolling is canceled in response to a predetermined user operation.

(14) The information processing system of (8), wherein the circuitry is further configured to receive a third user operation that is different from the first and second user operations, and to cause a third scrolling to scroll both the menu region and the content region together to reveal an area between the status region and the menu region, the area between the status region and the menu region being different from the status region, the menu region and the content region.

(15) The information processing system of (14), wherein the circuitry is further configured to receive a fourth user operation to cause a fourth scrolling to scroll the status region, the menu region and the content region together to reveal an area beyond the status region, the area beyond the status region being different from the status region, the menu region and the content region.

(16) The information processing system of (15), wherein the status region and the menu region are disposed at a top of the graphical user interface.

(17) The information processing system of (16), wherein the status region and the menu region are disposed at a bottom of the graphical user interface.

(18) The information processing system of any one of (1) to (18), wherein the circuitry receives user operation via a touchscreen.

(19) An information processing method, comprising: causing, with circuitry, a first scrolling of a displayed content region within boundaries thereof in response to a first user operation; and causing, with the circuitry, a second scrolling of the displayed content region beyond the boundaries thereon in response to a second user operation.

(20) A non-transitory computer-readable medium encoded with computer-readable instructions thereon that, when executed by a computer, cause the computer to perform a method comprising: causing, with circuitry, a first scrolling of a displayed content region within boundaries thereof in response to a first user operation; and causing, with the circuitry, a second scrolling of the displayed content region beyond the boundaries thereon in response to a second user operation.

(21) A display control device including:
a display controller that controls display on a touchscreen display, wherein the display controller
executes a first scrolling control that scrolls a document displayed on the touchscreen display within a display region that includes the document, and a second scrolling control that causes scrolling movement of the display region, and during the scrolling movement by the second scrolling control, causes a spacer that differs from the document to be displayed in a blank display part produced by scrolling movement of the display region, and in addition, causes at least a portion of interface elements included in the display region to remain operable, and wherein a first user operation for causing the display controller to execute the first scrolling control and a second user operation for causing the display controller to execute the second scrolling control are touch operations that differ from each other with respect to the display region on the touchscreen display.

(22) The display control device according to (21), wherein the display controller temporarily causes scrolling movement of the display region in the second scrolling control.

(23) The display control device according to (21) or (22), wherein the first user operation is an operation simpler than the second user operation.

(24) The display control device according to any one of (21) to (23),
wherein the display controller automatically determines a travel amount of the scrolling movement in the second scrolling control.

(25) The display control device according to (24), wherein the travel amount of the scrolling movement is determined according to a display size of the interface elements that remain operable.

(26) The display control device according to (24) or (25), wherein the spacer is an image expressing a relationship between the automatically determined travel amount and a current travel amount.

(27) The display control device according to any one of (21) to (26),
wherein, during the scrolling movement in the second scrolling control, the display controller causes interface elements placed within the document to remain operable.

(28) The display control device according to (21), wherein the display region includes the document and an interface element placement region in which interface elements that accept operations related to the document are placed, and
wherein, during the scrolling movement in the second scrolling control, the display controller causes interface elements placed in the interface element placement region to remain operable.

(29) The display control device according to (28), wherein, during the scrolling movement in the second scrolling control, the display controller disables interface elements placed within the document.

(30) The display control device according to (21), wherein the display region includes the document and a status display region that displays a status of a device that includes the touchscreen display, and
wherein, during the scrolling movement in the second scrolling control, the display controller causes the status display region to remain operable.

(31) The display control device according to (30), wherein, in the second scrolling control, the display controller reverts the scrolling movement when display of a status screen displayed by an operation on the status display region ends.

(32) The display control device according to any one of (21) to (31),
wherein, in the second scrolling control, the display controller reverts the scrolling movement when display of the document is changed by an operation on the interface elements that remain operable.

(33) The display control device according to any one of (21) to (31),
wherein, in the second scrolling control, the display controller reverts the scrolling movement when an operation on the interface elements that remain operable is executed.

(34) The display control device according to any one of (21) to (33),
wherein, on the touchscreen display, a position of the display region is fixed in a case in which the second scrolling control is absent.

(35) The display control device according to any one of (21) to (34),
wherein a travel direction of the scrolling movement in the second scrolling control is determined according to a position on the touchscreen display or on a case near the touchscreen display at which the second user operation was executed.

(36) The display control device according to any one of (21) to (35), further including:
a display unit, operating unit, storage unit, and communication unit constituting the touchscreen display,
wherein the display controller controls display by the display unit.

(37) The display control device according to (36), wherein the display control device is a smartphone or tablet.

(38) A display control method including:
executing, by a processor that controls display on a touchscreen display, a first scrolling control that scrolls a document displayed on the touchscreen display within a display region that includes the document, and a second scrolling control that causes scrolling movement of the display region, and
during the scrolling movement by the second scrolling control, causing, by the processor, a spacer that differs from the document to be displayed in a blank display part produced by scrolling movement of the display region, and in addition, causing, by the processor, at least a portion of interface elements included in the display region to remain operable,
wherein a first user operation for causing the processor to execute the first scrolling control and a second user operation for causing the processor to execute the second scrolling control are touch operations that differ from each other with respect to the display region on the touchscreen display.

(39) A program causing a computer that controls display on a touchscreen display to realize
a function that executes a first scrolling control that scrolls a document displayed on the touchscreen display within a display region that includes the document, and a second scrolling control that causes scrolling movement of the display region, and
a function that, during the scrolling movement by the second scrolling control, causes a spacer that differs from the document to be displayed in a blank display part produced by scrolling movement of the display region, and in addition, causes at least a portion of interface elements included in the display region to remain operable,
wherein a first user operation for causing the computer to execute the first scrolling control and a second user operation for causing the computer to execute the second scrolling control are touch operations that differ from each other with respect to the display region on the touchscreen display.

REFERENCE SIGNS LIST

100 client device
110 touchscreen display
112 display unit
114 operating unit 120 controller
130 storage unit
140 communication unit

The invention claimed is:

1. An information processing apparatus, comprising:
circuitry configured to cause, in response to a first touch operation, a first scrolling operation that scrolls content displayed in a content region of a display, the display being a touchscreen display,
cause, in response to a second touch operation, a second scrolling operation that displays and scrolls status information of a status of the information processing apparatus on the display, an initial position of the second touch operation being beyond a boundary of the content region of the display, and
in response to a third touch operation that is positioned in a region that contains the status information and occurs while the status information is being displayed as part of the second scrolling operation, revert from continued scrolling of the status information in the second scrolling operation and instead display a notification.

2. The information processing apparatus according to claim 1, wherein the first touch operation includes a drag operation.

3. The information processing apparatus according to claim 1, wherein the second touch operation includes a double-tap operation.

4. The information processing apparatus according to claim 1, wherein the second scrolling corresponds to a downward scroll.

5. The information processing apparatus according to claim 1, wherein, in response to a determination that a scroll of the status region is possible in the second scrolling, the circuitry is configured to scroll the content region and the status region.

6. The information processing apparatus according to claim 1, wherein, in response to a determination that a scroll of the status region is not possible in the second scrolling, the circuitry is configured to scroll the content region.

7. The information processing apparatus according to claim 1, wherein the content region includes content corresponding to one of a document, a web page, an image, and an icon.

8. A method for an information processing apparatus, the method comprising:
causing, in response to a first touch operation, a first scrolling operation that scrolls content displayed in a content region of a display, the display being a touchscreen display;
causing, in response to a second touch operation, a second scrolling operation that displays and scrolls status information of a status of the information processing apparatus on the display, an initial position of the second touch operation being beyond a boundary of the content region of the display; and
in response to a third touch operation that is positioned in a region that contains the status information and occurs while the status information is being displayed as part of the second scrolling operation, revert from continued scrolling of the status information in the second scrolling operation and instead display a notification.

9. The method according to claim 8, wherein the first touch operation includes a drag operation.

10. The method according to claim 8, wherein the second touch operation includes a double-tap operation.

11. The method according to claim 8, wherein the second scrolling corresponds to a downward scroll.

12. The method according to claim 8, wherein, in response to a determination that a scroll of the status region is possible in the second scrolling, scrolling the content region and the status region.

13. The method according to claim 8, wherein, in response to a determination that a scroll of the status region is not possible in the second scrolling, scrolling the content region.

14. The method according to claim 8, wherein the content region includes content corresponding to one of a document, a web page, an image, and an icon.

15. A non-transitory computer-readable storage medium including computer executable instructions, wherein the instructions, when executed by an information processing apparatus, cause the information processing apparatus to perform a method, the method comprising:
causing, in response to a first touch operation, a first scrolling operation that scrolls content displayed in a content region of a display, the display being a touchscreen display;
causing, in response to a second touch operation, a second scrolling operation that displays and scrolls status information of a status of the information processing apparatus on the display, an initial position of the second touch operation being beyond a boundary of the content region of the display; and
in response to a third touch operation that is positioned in a region that contains the status information and occurs while the status information is being displayed as part of the second scrolling operation, revert from continued scrolling of the status information in the second scrolling operation and instead display a notification.

16. A smartphone, comprising:
a touchscreen display; and
circuitry configured to
perform wireless communications,
cause, in response to a first touch operation, a first scrolling operation that scrolls content displayed in a content region of the touchscreen display,
cause, in response to a second touch operation, a second scrolling operation that displays and scrolls status information of a status of the smartphone on the display, an initial position of the second touch operation being beyond a boundary of the content region of the display, and
in response to a third touch operation that is positioned in a region that contains the status information and occurs while the status information is being displayed as part of the second scrolling operation, revert from continued scrolling of the status information in the second scrolling operation and instead display a notification.

17. The smartphone according to claim 16, wherein the first touch operation includes a double-tap operation.

18. The smartphone according to claim 16, wherein the second scrolling corresponds to a downward scroll.

19. The smartphone according to claim 16, wherein, in response to a determination that a scroll of the status region is possible in the second scrolling, the circuitry is configured to scroll the content region and the status region.

20. The smartphone according to claim 16, wherein, in response to a determination that a scroll of the status region is not possible in the second scrolling, the circuitry is configured to scroll the content region.

21. The smartphone according to claim 16, wherein the content region includes content corresponding to one of a document, a web page, an image, and an icon.

* * * * *